(12) United States Patent
Lee et al.

(10) Patent No.: US 10,695,758 B2
(45) Date of Patent: Jun. 30, 2020

(54) PHOTOCATALYST HAVING HIGH VISIBLE-LIGHT ACTIVITY

(71) Applicant: University of Ulsan Foundation for Industry Cooperation, Ulsan (KR)

(72) Inventors: Byeong Kyu Lee, Ulsan (KR); Thanhdong Pham, Ulsan (KR)

(73) Assignee: University of Ulsan Foundation for Industry Corporation, Ulsan (KR)

( * ) Notice: Subject to any disclaimer, the term of this patent is extended or adjusted under 35 U.S.C. 154(b) by 0 days.

(21) Appl. No.: 16/679,351

(22) Filed: Nov. 11, 2019

(65) Prior Publication Data
US 2020/0070135 A1 Mar. 5, 2020

Related U.S. Application Data

(62) Division of application No. 15/761,548, filed as application No. PCT/KR2015/012525 on Nov. 20, 2015.

(30) Foreign Application Priority Data

Sep. 23, 2015 (KR) .................. 10-2015-0134604
Oct. 12, 2015 (KR) .................. 10-2015-0142290

(51) Int. Cl.
*B01J 35/04* (2006.01)
*B01J 35/00* (2006.01)
(Continued)

(52) U.S. Cl.
CPC ........... *B01J 35/004* (2013.01); *B01J 21/063* (2013.01); *B01J 21/18* (2013.01); *B01J 23/22* (2013.01); *B01J 23/75* (2013.01); *B01J 23/755* (2013.01); *B01J 27/20* (2013.01); *B01J 35/1019* (2013.01); *B01J 35/1038* (2013.01); *B01J 35/1061* (2013.01); *B01J 35/1076* (2013.01);
(Continued)

(58) Field of Classification Search
None
See application file for complete search history.

(56) References Cited

U.S. PATENT DOCUMENTS

| 2007/0181508 A1 | 8/2007 | Gui et al. |
| 2007/0202334 A1 | 8/2007 | Xie et al. |

(Continued)

FOREIGN PATENT DOCUMENTS

| CN | 101966469 A | * 2/2011 |
| CN | 103861600 | 6/2014 |

(Continued)

OTHER PUBLICATIONS

JP-09192496-A—english translation (Year: 1997).*

(Continued)

*Primary Examiner* — Stefanie J Cohen

(57) ABSTRACT

A photocatalyst according to the present invention has a structure in which the titanium dioxide doped with the transition metals is supported on the support such that a band gap thereof is low and a specific surface area thereof is high, thereby exhibiting an excellent photocatalytic activity even in a visible light region and providing an excellent effect of adsorbing an organic compound and removing the same even under a condition in which light is not emitted.

3 Claims, 16 Drawing Sheets

(51) Int. Cl.

| | |
|---|---|
| *C02F 1/28* | (2006.01) |
| *B01J 23/75* | (2006.01) |
| *C02F 1/72* | (2006.01) |
| *C08G 18/78* | (2006.01) |
| *C02F 1/30* | (2006.01) |
| *C08G 18/76* | (2006.01) |
| *C08G 18/18* | (2006.01) |
| *B01J 35/10* | (2006.01) |
| *B01J 37/08* | (2006.01) |
| *B01J 23/22* | (2006.01) |
| *B01J 37/16* | (2006.01) |
| *B01J 37/00* | (2006.01) |
| *B01J 23/755* | (2006.01) |
| *B01J 27/20* | (2006.01) |
| *B01J 37/03* | (2006.01) |
| *B01J 21/06* | (2006.01) |
| *B01J 21/18* | (2006.01) |
| *B01J 37/02* | (2006.01) |
| *B01J 37/34* | (2006.01) |
| *C02F 101/32* | (2006.01) |
| *C02F 101/30* | (2006.01) |
| *C02F 101/36* | (2006.01) |
| *C02F 101/34* | (2006.01) |
| *C02F 1/32* | (2006.01) |
| *B01J 31/06* | (2006.01) |
| *C08L 67/00* | (2006.01) |
| *C08L 75/04* | (2006.01) |
| *C08L 77/00* | (2006.01) |

(52) U.S. Cl.
CPC ....... *B01J 37/0009* (2013.01); *B01J 37/0201* (2013.01); *B01J 37/033* (2013.01); *B01J 37/08* (2013.01); *B01J 37/16* (2013.01); *B01J 37/34* (2013.01); *C02F 1/28* (2013.01); *C02F 1/30* (2013.01); *C02F 1/725* (2013.01); *C08G 18/18* (2013.01); *C08G 18/7621* (2013.01); *C08G 18/7843* (2013.01); *B01J 31/06* (2013.01); *B01J 2523/55* (2013.01); *B01J 2523/845* (2013.01); *B01J 2523/847* (2013.01); *C02F 1/32* (2013.01); *C02F 2101/301* (2013.01); *C02F 2101/306* (2013.01); *C02F 2101/322* (2013.01); *C02F 2101/345* (2013.01); *C02F 2101/36* (2013.01); *C02F 2305/10* (2013.01); *C08L 67/00* (2013.01); *C08L 75/04* (2013.01); *C08L 77/00* (2013.01); *Y02W 10/37* (2015.05)

(56) References Cited

U.S. PATENT DOCUMENTS

| | | |
|---|---|---|
| 2010/0258977 A1 | 10/2010 | Sakurai et al. |
| 2011/0082026 A1* | 4/2011 | Sakatani ............... B01J 21/063 502/159 |
| 2012/0171079 A1 | 7/2012 | Morita et al. |
| 2014/0102991 A1 | 4/2014 | Kharlampieva et al. |
| 2015/0299380 A1* | 10/2015 | Cooper ................. C08G 61/02 429/249 |
| 2018/0345264 A1 | 12/2018 | Lee |

FOREIGN PATENT DOCUMENTS

| | | |
|---|---|---|
| JP | 09192496 A * | 7/1997 |
| KR | 10-2003-0066367 | 8/2003 |
| WO | WO 2009/086006 | 7/2009 |
| WO | WO 2011/132036 | 10/2011 |
| WO | WO 2017/051979 | 3/2017 |

OTHER PUBLICATIONS

Odelius et al, Porosity and Pore Size Regulate the Degradation Product Profile of Polylactide, Biomolecules, pp. 1250-1258 (Year: 2011).*
CN-101966469-A—english translation (Year: 2011).*
Mahesh et al, Chemically modified polyurethane—SiO2/TiO2 hybrid composite film and its reusability for photocatalytic degradation of Acid Black 1 (AB 1) under UV light, Applied Catalysis A: General, 475, 235-241 (Year: 2014).*
Official Action dated Jun. 17, 2019 From U.S. Appl. No. 15/761,548. (18 pages).
Restriction Official Action dated Jan. 2, 2019 From U.S. Appl. No. 15/761,548. (9 pages).
Fan et al. "Nanocomposites of TiO2 and Reduced Graphene Oxide as Efficient Photocatalysts for Hydrogen Evolution", The Journal of Physical Chemistry, 115(21): 10694-10701, May 9, 2011.
Kim et al. "In Situ Synthesis of Three-Dimensional Self-Assembled Metal Oxide-Reduced Graphene Oxide Architecture", Chemistry of Materials, 26(16): 4638-4643, Aug. 5, 2014.
Nguyen-Phan et al. "Photocatalytic Performance of Sn-Doped TiO2/ Reduced Graphene Oxide Composite Materials", Applied Catalysis A: General, 473: 21-30, Available Online Jan. 3, 2014.
Odelius et al. "Porosity and Pore Size Regulate the Degradation Product Profile of Polylactide", Biomacromolecules, 12(4): 1250-1258, Feb. 23, 2011.
Paul et al. "Visible Photocatalytic Activity Of Vanadium Doped With Titanium Dioxide For Biomedical Applications", International Journal of ChemTech Research,7(5): 2125-2129, 2014-2015.
Pham et al. "Cu Doped TiO2/GF for Photocatalytic Disinfection of *Escherichia Coli* in Bioaerosols Under Visible Light Irradiation: Application and Mechanism", Applied Surface Science, 296: 15-23, Available Online Jan. 10, 2014.
Pham et al. "Novel Adsorption and Photocatalytic Oxidation for Removal of Gaseous Toluene by V-Doped TiO2/PU Under Visible Light", Journal of Hazardous Materials, 300: 493-503, Available Online Jul. 23, 2015.
Pham et al. "Novel Integrated Approach of Adsorption and Photo-Oxidation Using Ag—TiO2/Pu for Bioaerosol Removal Under Visible Light", Chemical Engineering Journal, 275: 357-365, Available Online Apr. 16, 2015.
Phan et al. "Photocatalytic Performance of Sn-Doped Ti02 / Reduced Graphene Oxide Composite Materials", Applied Catalysis A: General 473: 21-30, 2014.
Sharma et al. "Adsorptive/Photo-Catalytic Process for Naphthalene Removal From Aqueous Media Using In-Situ Nickel Doped Titanium Nanocomposite", Journal of Environmental Management, 155-114-122, Available Online Mar. 26, 2015.
Sharma et al. "Photo-Catalytic Degradation of 2-Chlorophenol Under Visible Light Irradiation by Ti—Co Nanocomposite Supported by Graphene Oxide", Third International Conference on Advanced Oxidation Process, AOP 2014, Munar, India, Sep. 25-28, 2014, Conference Abstract, Sep. 25, 2014.
Sharma et al. Rapid Photo-Degradation of 2-Chlorophenol Under Visible Light Irradiation Using Cobalt Oxide-Loaded TiO2/ Reduced Graphene Oxide Nanocomposite From Aqueous Media, Journal of Environmental Management, 165: 1-10, Available Online Sep. 18, 2015.

* cited by examiner

PHOTOCATALYST HAVING HIGH VISIBLE-LIGHT ACTIVITY

RELATED APPLICATIONS

This application is a Division of U.S. patent application Ser. No. 15/761,548 filed on Mar. 20, 2018, which is a National Phase of PCT Patent Application No. PCT/KR2015/012525 having International filing date of Nov. 20, 2015, which claims the benefit of priority of Korean Patent Application Nos. 10-2015-0142290 filed on Oct. 12, 2015 and 10-2015-0134604 filed on Sep. 23, 2015. The contents of the above applications are all incorporated by reference as if fully set forth herein in their entirety.

FIELD AND BACKGROUND OF THE INVENTION

The present invention relates to a photocatalyst having excellent visible-light activity because the photocatalyst includes a support on which titanium dioxide doped with a transition metal is supported.

Aromatic organic compounds such as benzene, xylene, toluene, and the like are highly volatile organic compounds that have been industrially widely used as solvents, detergents, and the like, and also used as organic agricultural chemicals such as pesticides, disinfectants, herbicides, and the like in the field of agriculture. However, these organic compounds include components that are toxic and carcinogenic to humans and cause growth disorders, deformities, and the like in animals and plants. As a result, the preparation, use and disposal of the organic compounds have been strictly regulated, but conventional technologies for disposing of aromatic organic compounds have drawbacks in that they require high costs, and it is actually difficult to dispose of the organic compounds due to their low efficiency.

Meanwhile, when a photocatalyst receives light having an energy greater than or equal to band gap energy, the photocatalyst excites electrons from a valence band to a conduction band so that electrons are formed in the conduction band and holes are formed in the valence band. In this case, the formed electrons and holes spread on a surface of the photocatalyst to participate in an oxidation/reduction reaction.

Photocatalysis may be used to directly photodecompose water using solar energy to produce hydrogen as a next-generation alternative source of energy, and may also be used to decompose volatile organic compounds (VOCs), various odors, waste water, non-degradable contaminants and environmental hormones, kill germs and bacteria, and the like. Therefore, photocatalyst technology in which only solar energy is used at room temperature has been applied to produce hydrogen and clean up the environment, and thus has attracted attention as a powerful means capable of solving environmental issues.

However, in the case of titanium dioxide ($TiO_2$) which has been widely used as the photocatalyst, photocatalysis occurs only in an ultraviolet region including approximately 4% of total sunlight, as disclosed in US Patent Application Publication No. 2012-0171079. Also, photocatalysis has a problem in that ultraviolet (UV) light causes diseases such as skin cancer when organisms are exposed to the UV light.

Therefore, to effectively utilize the photocatalyst technology to remove the organic compounds, there is an urgent demand for the development of photocatalyst materials that have a high activity in a visible light region which accounts for approximately 43% of total sunlight.

SUMMARY OF THE INVENTION

To solve the problems of the prior art, it is an object of the present invention to provide a photocatalyst having excellent photocatalytic activity in a visible light region.

To achieve the objects of the present invention, according to an aspect of the present invention, there is provided a photocatalyst including:
titanium dioxide doped with a transition metal; and
a support on which the titanium dioxide is supported,
wherein the support is a reduced graphene oxide or a polymer matrix having a porous structure.

A photocatalyst according to the present invention has a structure in which titanium dioxide doped with a transition metal is supported on a support such that the photocatalyst has a low band gap and a high specific surface area. Therefore, the photocatalyst of the present invention can exhibit excellent photocatalytic activity even visible light region, and also have an excellent effect of adsorbing and removing an organic compound even under a condition in which the photocatalyst is not irradiated with light.

DESCRIPTION OF SPECIFIC EMBODIMENTS OF THE INVENTION

Figure 1:
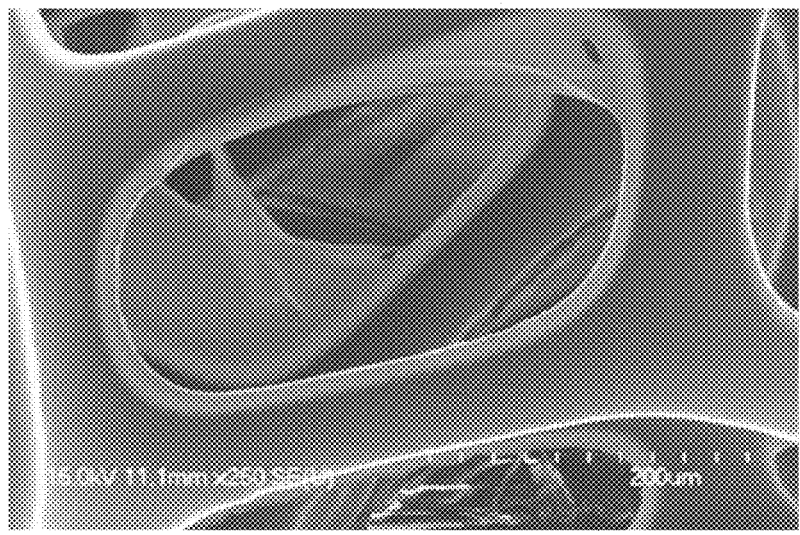
FIG. 1 is a scanning electron microscope (SEM) image of an activated polyurethane matrix (PU).

The present invention may be subjected to many changes and modifications and have several forms. Therefore, it should be understood that specific embodiments of the present invention are illustrated in the drawings and described in detail in the detailed description.

However, it should be understood that the present invention is not intended to be limited to the specific forms set forth herein, and is intended to encompass all types of changes, equivalents, and substitutions included in the technical scope and spirit of the present invention.

It will be further understood that the terms "comprises," "comprising," "includes," "including," "has" and/or "having," when used herein, specify the presence of stated features, integers, steps, operations, elements, components and/or groups thereof, but do not preclude the presence or addition of one or more other features, integers, steps, operations, elements, components and/or groups thereof.

Also, it should be understood that the drawings presented herein may be shown in an exaggerated or diminished way for the sake of convenience of description.

In the present invention, the term "ultraviolet light (UV light)" refers to light having a wavelength shorter than visible light and longer than X rays, that is, light which is in a wavelength range of approximately 10 to 390 nm and has energy higher than visible light.

Also, in the present invention, the term "visible light" refers to light having a wavelength shorter than infrared light and longer than ultraviolet light, that is, light that is in a wavelength range of approximately 390 to 820 nm, and accounts for the largest percentage among light (for example, ultraviolet light, visible light, infrared light, and the like) included in sunlight.

The present invention relates to a photocatalyst having a high activity in a visible light region because the photocatalyst includes a support on which titanium dioxide doped with a transition metal is supported.

Because aromatic organic compounds such as benzene, xylene, toluene, and the like include components that are toxic and carcinogenic to humans and cause growth disorders, deformities, and the like in animals and plants, the preparation, use and disposal of the organic compounds have been strictly regulated. However, methods of removing conventional aromatic organic compounds have limitations in effectively removing the aromatic organic compounds because the methods require high costs but have low efficiency. Also, techniques currently developed to solve these problems use photocatalysts including titanium dioxide having an activity in an ultraviolet region. In this case, because the ultraviolet light accounts for only approximately 4% of total sunlight, the ultraviolet light has low photodecomposition efficiency, and also causes diseases such as skin cancer when organisms are exposed thereto. Therefore, the ultraviolet light has a limitation due to being harmful to organisms. Therefore, to make effective use of photocatalyst technology, there is a need for development of a photocatalyst material having a high visible-light activity, which may make effective use of visible light which accounts for approximately 43% of sunlight.

Therefore, the present invention provides a photocatalyst having a high activity in a visible light region because the photocatalyst includes a support on which titanium dioxide doped with a transition metal is supported.

The photocatalyst according to the present invention has a low band gap and a high specific surface area because the photocatalyst has a structure in which the titanium dioxide doped with the transition metal is supported on the support, thereby exhibiting excellent photocatalytic activity even in a visible light region. Also, the photocatalyst may be effectively used to remove a material such as an organic compound, particularly an aromatic organic compound, because the photocatalyst has an excellent effect of adsorbing and removing an organic; pound even under a condition in which the photocatalyst is not irradiated with light.

Hereinafter, the present invention will be described in detail.

Photocatalyst

According to one aspect of the present invention, there is provided a photocatalyst including:
titanium dioxide doped with a transition metal; and
a support on which the titanium dioxide is supported,
wherein the support is a reduced graphene oxide or a polymer matrix having a porous structure.

The photocatalyst according to the present invention may have a structure in which titanium dioxide doped with a transition metal (M) is supported on a reduced graphene oxide or a polymer matrix having a porous structure such as a honeycomb structure, a honeycomb lattice structure, and the like. In this case, the transition metal (M) may include one or more selected from the group consisting of vanadium (V), cobalt (Co), and nickel (Ni). Specifically, the transition metal (M) may be vanadium (V) or cobalt (Co). Also, the polymer matrix has excellent porosity as a porous structure, and may include one or more selected from a polyurethane resin, a polyester resin, and a polyamide resin, all of which exhibit excellent adsorption of harmful substances according to the excellent porosity. Specifically, the polymer matrix may be a polyurethane resin having a porous structure.

According to one example, in the photocatalyst according to the present invention, when the support included in the photocatalyst is a reduced graphene oxide, the titanium dioxide supported on the reduced graphene oxide may be doped with cobalt (Co) or nickel (Ni). In this case, the photocatalyst may include titanium dioxide as a main ingredient. Specifically, the photocatalyst may include 100 parts by weight of titanium dioxide; 0.1 to 1 part by weight of cobalt; and 1 to 10 parts by weight of a reduced graphene oxide, and, more specifically, may include 100 parts by weight of titanium dioxide; 0.1 to 0.6 part by weight of cobalt; and 4 to 7 parts by weight of a reduced graphene oxide.

According to another example, when the support included in the photocatalyst is a polymer matrix, the titanium dioxide supported on the polymer matrix may be doped with vanadium (V). In this case, the photocatalyst may include 0.1 to 15 parts by weight, specifically 0.5 to 13 parts by weight, 1 to 10 parts by weight, 2 to 10 parts by weight, or 4 to 8 parts by weight of the titanium dioxide doped with vanadium (V), based on 100 parts by weight of the polymer matrix.

More specifically, the polymer matrix may be included at a content of 80 to 95 parts by weight, based on 100 parts by weight of the photocatalyst. For example, the content of the polymer matrix may be in a range of 85 to 95 parts by weight, or 90 to 95 parts by weight.

Also, the titanium dioxide may be included at a content of 1 to 10 parts by weight, based on 100 parts by weight of the photocatalyst. For example, the content of the titanium dioxide may be in a range of 3 to 10 parts by weight, or 5 to 10 parts by weight. When the photocatalyst includes the titanium dioxide within this content range, excellent photoactivity may be realized.

In addition, the transition metal may be included at a content of 1 to 10 parts by weight, based on 100 parts by weight of the photocatalyst. For example, the content of the transition metal may be in a range of 1 to 8 parts by weight, or 3 to 8 parts by weight.

In the photocatalyst according to the present invention, the titanium dioxide may be doped with a transition metal (M) to form a chemical bond (Ti—O-M) that shares the transition metal and an oxygen atom. Here, such a chemical bond to the transition metal causes the photocatalyst to improve the transfer efficiency of photogenerated electrons, thereby enhancing the activity of the photocatalyst. Also, when the titanium dioxide is supported on the reduced graphene oxide as the support, a chemical bond (C—O—Ti—O-M and/or C—Ti—O-M) between a titanium atom and a carbon atom of the reduced graphene oxide is formed so that larger numbers of electrons and holes can be formed without separating the titanium dioxide from a surface of the reduced graphene oxide during a photoreaction, resulting in increased photocatalytic activity. That is, the photocatalyst has an advantage in that it can be applied to products used indoors because the photocatalyst may be easily re-used due to excellent durability thereof and serve to improve photocatalytic activity in a visible light region.

According to one example, the photocatalyst may have a light absorbance of 40% or more at 200 to 800 nm. Specifically, when the support includes a reduced graphene oxide, the photocatalyst may have a light absorbance of approximately 90% or more at a wavelength of 350 nm or less, and a light absorbance of approximately 40% or more, more specifically approximately 41% or more, approximately 42% or more, or approximately 43% or more at a wavelength of 500 nm or more. Also, when the support of the photocatalyst is a polymer matrix, the light absorbance in a wavelength range of 400 to 700 nm may be in a range of 50 to 80%, or 50 to 70%. This indicates that the excited photon energy of the photocatalyst is reduced due to structural characteristics of the photocatalyst, and electrons easily undergo 'charge transition.'

According to another example, the photocatalyst may have a band gap of 4 eV or less. Specifically, when the support includes a reduced graphene oxide, the photocatalyst may have a band gap of 2.7 to 2.9 eV in a wavelength range of 400 to 800 nm. Specifically, the photocatalyst may have a band gap of 2.75 to 2.85 eV, or 2.80 to 2.85 eV. Also, when the support is a polymer matrix, the band gap of the photocatalyst may be in a range of 0.1 to 4 eV, 1 to 4 eV, or 2.5 to 3.1 eV.

Generally, the photocatalyst may receive light having an energy higher than band gap energy to perform a photoexcitation reaction. Specifically, the photoexcitation reaction may refer to a process in which electrons are formed in a conduction band and holes are formed in a valence band by receiving a region of light having a certain energy in incident light to excite electrons from the valence band to the conduction band. In this case, an organic compound may be decomposed by spreading the formed electrons and holes onto a surface of the photocatalyst to participate in an oxidation/reduction reaction. However, because conventional photocatalysts have a large band gap between a valence band and a conduction band, the photocatalysts have to be irradiated with ultraviolet light of high energy in order to cause a photoexcitation reaction between the valence band and the conduction band. The band gap of the photocatalyst according to the present invention may be adjusted to this range to perform a photoexcitation reaction even in a visible light region of sunlight as well as the ultraviolet light region.

Also, the photocatalyst according to the present invention includes a support having a porous structure including micropores, and thus has a large average BET specific surface area, thereby exhibiting an excellent adsorption capacity.

Here, when an average diameter of the micropores included in the photocatalyst is less than or equal to 500 μm, the average diameter may vary depending on the type of the support included in the photocatalyst. Specifically, when the support of the photocatalyst is a reduced graphene oxide, the photocatalyst may include micropores having an average diameter of 8 to 10 nm, specifically an average diameter of 8.5 to 9.5 nm; or 8.5 to 9 nm. In this case, the micropores may have a volume of 0.1 to 0.3 cm$^3$/g; 0.2 to 0.3 cm$^3$/g; or 0.25 to 0.3 cm$^3$/g. Also, when the support of the photocatalyst is a polymer matrix, the micropores may have an average diameter of 50 to 500 μm, and pores may have an average volume of 0.01 to 0.03 cm$^3$/g. More specifically, the average particle diameter of the pores may be in a range of 50 to 400 μm, or 100 to 300 μm, and the average volume of the pores may be in a range of 0.015 to 0.025 cm$^3$/g, or 0.016 to 0.02 cm$^3$/g.

In addition, the photocatalyst may have an average BET specific surface area of 100 to 500 m$^2$/g. Specifically, when the support of the photocatalyst is a reduced graphene oxide, the photocatalyst may have an average BET specific surface area of 100 to 140 m$^2$/g, and, more specifically, an average BET specific surface area of 100 to 130 m$^2$/g; 100 to 120 m$^2$/g; 115 to 130 m$^2$/g; 115 to 125 m$^2$/g; or 115 to 120 m$^2$/g. Additionally, when the support of the photocatalyst is a polymer matrix, the photocatalyst may have an average BET specific surface area of 120 to 480 m$^2$/g, 120 to 400 m$^2$/g, or 130 to 250 m$^2$/g. The photocatalyst according to the present invention may satisfy a range of the average BET specific surface area to realize an excellent adsorption capacity with respect to organic compounds.

Method of Preparing Photocatalyst

According to another aspect of the present invention, there is provided a method of preparing a photocatalyst, which includes:

supporting titanium dioxide on a support having a porous structure, which includes a reduced graphene oxide or a polymer matrix.

According to one example, when the support included in the photocatalyst is a reduced graphene oxide, the method of preparing a photocatalyst may include:

obtaining a graphene oxide, on which titanium dioxide doped with cobalt is supported, from a dispersion including a graphene oxide and titanium dioxide doped with cobalt; and heat-treating the graphene oxide on which the titanium dioxide is supported to obtain a reduced graphene oxide on which the titanium dioxide doped with cobalt is supported.

For example, in the preparation method, dispersions in which cobalt-doped titanium dioxide ($Co—TiO_2$) and oxidized graphene oxide (GO) are dispersed, respectively, may be mixed to obtain a graphene oxide($Co—TiO_2$/GO) in which the cobalt-doped titanium dioxide is supported, and the graphene oxide ($Co—TiO_2$/GO) thus obtained may be heat-treated to obtain a photocatalyst ($Co—TiO_2$/rGO) in which the graphene oxide (GO) is reduced and peeled off.

Here, the titanium dioxide ($Co—TiO_2$) may be used without limitation as long as the titanium dioxide is doped with cobalt. Specifically, in the obtaining of the graphene oxide on which the titanium dioxide is supported, titanium dioxide doped with cobalt obtained by sequentially adding water and a reducing agent to a mixture including a titanium precursor and metallic cobalt (Co) may be used prior to mixing the dispersions in which the cobalt-doped titanium dioxide ($Co—TiO_2$) and the oxidized graphene oxide (GO) are dispersed, respectively.

In this case, types of titanium precursors may be used without limitation as long as the titanium precursors are reduced to form titanium dioxide ($TiO_2$). For example, titanium isopropoxide (TIP) and the like may be used as the titanium precursor.

Also, the reducing agent may include one or more selected from the group consisting of sodium hydride (NaH), sodium borohydride ($NaBH_4$), and lithium aluminum hydride ($LiAlH_4$). Specifically, sodium borohydride ($NaBH_4$) may be used as the reducing agent.

In the method of preparing a photocatalyst according to the present invention, the heat-treating of the graphene oxide ($Co—TiO_2$/GO) on which the titanium dioxide is supported includes reducing the oxidized graphene oxide and peeling off the reduced graphene oxide. In this case, because the photocatalyst has an excellent reduction rate of the oxidized graphene oxide, the heat treatment may be performed in a temperature range of 400 to 600° C. for 1 to 60 minutes. Specifically, the heat treatment temperature may be in a range of 450 to 600° C.; 450 to 550° C.; or 475 to 525° C. Also, the heat treatment time may be in a range of 1 to 30 minutes; 20 to 35 minutes; 40 to 60 minutes; or 1 to 10 minutes.

According to another example, when the support included in the photocatalyst is a polymer matrix, the method of preparing a photocatalyst may include:

activating a surface of a polymer matrix resin;

dispersing a titanium dioxide precursor in the polymer matrix whose surface is activated; and doping the polymer matrix, in which the titanium dioxide precursor is dispersed, with a transition metal precursor.

In this case, the activating of the surface of the polymer matrix resin may include activating a surface of the polymer matrix resin with an isocyanate group (NCO). For example, the surface of the polymer matrix resin may be activated by mixing a basic organic compound and a compound including a polyisocyanate with a polymer matrix resin to introduce an isocyanate group (NCO) at the surface of the polymer matrix resin.

Here, the basic organic compound may include tertiary amines, for example, trimethylamine, triethylamine, tri-n-propylamine, triisopropylamine, tributylamine, diisopropylamine, and triphenylamine. Specifically, the basic organic compound may be triethylamine.

Also, the polyisocyanate compound may, for example, include toluene diisocyanate, diphenylmethane diisocyanate, hexamethylene diisocyanate, 2,2,4-trimethylhexamethylene diisocyanate, 2,4,4-trimethylhexamethylene diisocyanate, p-phenylene diisocyanate, 4,4'-dicyclohexylmethane diisocyanate, 3,3'-dimethyldiphenyl-4,4'-diisocyanate, dianisidine diisocyanate, m-xylene diisocyanate, isophorone diisocyanate, 1,5-naphthalene diisocyanate, trans-1,4-cyclohexyl diisocyanate, lysine diisocyanate, dimethyltriphenylmethane tetraisocyanate, triphenylmethane triisocyanate, and tris(isocyanatophenyl) thiophosphate. Specifically, the polyisocyanate compound may be toluene diisocyanate.

Specifically, in the activating of the surface of the polymer matrix resin, triethylamine accepts hydrogen from the polymer matrix resin to cleave a urea bond in the polymer matrix resin and form an isocyanate bond, and free oxygen of the urea attacks toluene diisocyanate to form a toluene derivative having a new urea bond formed therein. In this way, an isocyanate group (NCO) may be introduced into a surface of the polyurethane resin to activate the surface of the polyurethane resin.

Also, in the case of the preparation method according to the present invention, in the dispersing of the titanium dioxide precursor in the polymer matrix whose surface is activated, the titanium dioxide precursor may further include a binder. Here, the binder may include one or more selected from a silane-based binder, a titanate-based binder, a urea binder, an ionic binder, and a covalent binder.

The binder is used for the purpose of improving the tensile strength, flexural strength, compressive strength and modulus of composites consisting of different materials, and optionally used to enhance a bond between the different materials. In the present invention, a silane-based binder may be used as the binder to improve binding affinity between the polymer matrix and the titanium dioxide. The silane-based binder may, for example, include one or more selected from tetramethoxysilane (TMOS), tetraethoxysilane (TEOS), tetrabutoxysilane (TBS), 3-aminopropyl triethoxysilane (APTES), and 3-aminopropyl trimethoxysilane (APTMS). In addition, the titanium dioxide precursor may be prepared by mixing a binder and titanium dioxide. In this case, the titanium dioxide may be provided with a functional group of the binder. For example, the silane-based binder may be mixed with the titanium dioxide precursor to prepare a silanized titanium dioxide mixture. In this way, amino titanosiloxane having an Si—O—Ti bond and an amino group ($NH_2$) may be prepared.

The amino group of the amino titanosiloxane thus prepared may be chemically bound to an isocyanate group of the surface of the previously activated polyurethane resin so that the amino titanosiloxane can be fixed to the surface of the polyurethane resin.

In this case, titanium isopropoxide (TTIP) may be included as the titanium dioxide. A dispersion obtained by dispersing a binder and titanium dioxide in a solvent may be used as the titanium dioxide precursor, when necessary. Also, water, methanol, ethanol, propanol, toluene, chloroform, N,N-dimethylformamide, tetrahydrofuran, and benzene may be used as the solvent, but the present invention is not limited thereto. According to the present invention, the binder and titanium dioxide may be dispersed using the solvent to exhibit high dispersibility and ensure high stability and durability.

In addition, in the preparation method according to the present invention, one or a mixture of two or more types of the transition metal precursors in the doping of the polymer matrix with the transition metal precursor may be dispersed using the solvent. For example, the transition metal precursor may include ammonium metavanadate ($NH_4VO_3$). In this case, types of the solvent used herein are as described above.

After the doping of the polymer matrix, in which the titanium dioxide precursor is dispersed, with the transition metal precursor, the method of the present invention may further include irradiating the polymer matrix with UV rays for 3 to 6 hours and calcining the polymer matrix at 150 to 300° C. for 3 to 6 hours under a nitrogen atmosphere. In this way, the photocatalyst in which the titanium dioxide doped with the transition metal is dispersed in the polymer matrix may be prepared.

Method of Removing Organic Compound Using Photocatalyst

According to still another aspect of the present invention, there is provided a method of removing an organic compound, particularly an aromatic organic compound such as benzene, toluene, xylene, 2-chlorophenol, or the like present in water and/or air, using the photocatalyst.

According to one example, when the aromatic organic compound is present in water, the method of removing an organic compound according to the present invention may include:

mixing an aqueous solution containing an organic compound with a photocatalyst including a reduced graphene oxide in which cobalt-doped titanium dioxide is supported to adsorb the organic compound in the aqueous solution onto the photocatalyst; and irradiating the photocatalyst onto which the organic compound is adsorbed with light to photodecompose the organic compound.

In the case of the method, the organic compound remaining in the aqueous solution may be removed with high efficiency by allowing the aforementioned photocatalyst of the present invention to come into contact with the aqueous solution containing the organic compound to adsorb the organic compound onto the photocatalyst and irradiating the photocatalyst with light having a wavelength in a visible light region to photodecompose the organic compound.

In this case, the emitted light may be light having a wavelength of 360 to 850 nm, and specifically light having a wavelength of 380 to 800 nm; 390 to 820 nm; 400 to 800 nm; 400 to 700 nm; 450 to 750 nm; 500 to 800 nm; 450 to 650 nm; 500 to 720 nm; 380 to 500 nm; or 380 to 450 nm.

Also, to maximize an adsorption rate of the photocatalyst with respect to the organic compound present in the aqueous solution, the pH value of the aqueous solution including the organic compound may be in a range of pH 6 to 8, and a concentration of the organic compound included in the aqueous solution may be less than or equal to 200 mg per 1 L of the aqueous solution including the organic compound. Specifically, the pH value of the aqueous solution may be in a range of 5 to 7; 6 to 6.5; 5.0 to 6; 5.5 to 7; 5.5 to 6.5; or 5.7 to 6.3, and the concentration of the organic compound may be less than or equal to 150 mg; 140 mg; 130 mg; or 115 mg per 1 L of the aqueous solution including the organic compound.

In addition, a contact amount of the photocatalyst which comes in contact with the organic compound in the aqueous solution may be less than or equal to 10 parts by weight per 1,000 parts by weight of the aqueous solution including the organic compound at a concentration of 90 to 110 mg/L. More specifically, the contact amount of the photocatalyst may be less than or equal to 7.5 parts by weight; or 5 parts by weight; or in a range of 5 to 0.5 parts by weight; 4 to 0.5 parts by weight; or 3.5 to 0.8 parts by weight per 1,000 parts by weight of the aqueous solution including the organic compound. A water treatment method according to the present invention may prevent a photodecomposition rate from being deteriorated due to a shielding effect caused by an excessive amount of the photocatalyst by controlling, within this range, the contact amount of the photocatalyst which comes in contact with the organic compound remaining in the aqueous solution.

Additionally, light irradiation may be performed without particular limitation as long as the photocatalyst can be irradiated with a sufficient amount of light. According to one example, light irradiation may be performed using an average power output of 50 to 200 W, and specifically performed using an average power output of 50 to 150 W; 100 to 200 W; or 75 to 125 W.

Further, the method of removing an organic compound according to the present invention may further include mixing a radical carrier with the aqueous solution including the organic compound prior to adsorbing the organic compound in the aqueous solution onto the photocatalyst. The radical carrier is photodecomposed during water treatment to form hydroxyl radicals (.$OH^-$). Then, the hydroxyl radicals thus formed may serve as a catalyst that decomposes the organic compound remaining in the aqueous solution. Radical carriers may be used without limitation as such a radical carrier as longs the radical carriers may stably form radicals by light irradiation in the aqueous solution. According to one example, hydrogen peroxide ($H_2O_2$) may be used. In addition, the radical carrier may be used at a content of 0.0001 to 0.1 part by weight, based on 100 parts by weight of the aqueous solution including the organic compound at a concentration of 90 to 110 mg/L. Specifically, the radical carrier may be used at a content of 0.0005 to 0.1 part by weight, 0.0005 to 0.05 part by weight, or 0.001 to 0.01 part by weight. According to the present invention, when the radical carrier is used within this content range, an effect of improving water treatment efficiency due to the insufficient supply of the radical carrier can be insignificant, or formed radicals reacting with an extra amount of the radical carrier when an excessive amount of the radical carrier is used to photodecompose the organic compound can be prevented.

EXAMPLES

Hereinafter, the present invention will be described in further detail with reference to examples and experimental examples thereof.

However, it should be understood that the following examples and experimental examples are given for the purpose of illustration only, and are not intended to limit or define the scope of the invention.

Example 1

A dispersion (5 mL) in which an oxidized graphene oxide (GO, 20 mg) was dispersed, and cetyl trimethylammonium bromide (CTAB, 0.5 g) were added to ethanol (30 mL), and stirred at room temperature for 30 minutes to prepare a solution A in which the graphene oxide was dispersed.

Next, separately, distilled water (120 mL) in which 1% by weight of cobalt nitrate was dissolved was added to a 250 mL flask, and titanium isopropoxide (TIP, 7.44 mL) and acetic acid (14.32 mL) were added thereto, and stirred for an hour. Thereafter, 0.5 M sodium borohydride ($NaBH_4$, 2 mL) was added dropwise to the flask, and stirred for 20 minutes to prepare a solution B in which cobalt-doped white titanium dioxide (Ti—O—Co) was dispersed.

The solution B was added dropwise to the previously prepared solution A, and distilled water (20 mL) was added thereto, and then stirred at room temperature for 12 hours. Thereafter, the resulting solution was filtered, and the filtrate was washed with distilled water, and then dried overnight at 80° C. to obtain a graphene oxide (Co—$TiO_2$/GO) on which the cobalt-doped titanium dioxide was supported. Subsequently, the resulting graphene oxide was sintered at 500° C. for 5 minutes to obtain a reduced graphene oxide (Co—$TiO_2$/rGO), on which the cobalt-doped titanium dioxide was supported, as the photocatalyst.

Examples 2 to 6

(1) Preparation of Polymer Matrix Resin

Trimethylamine and toluene-2,4-diisocyanate were mixed with a polyurethane resin to activate an isocyanate group of the polyurethane resin. This can be confirmed through FIG. 1. Specifically, FIG. 1 is a scanning electron microscope (SEM) image of an activated polyurethane matrix (PU). In this way, it can be seen that the polyurethane matrix has a porous structure having an average particle diameter of approximately 100 to 300 μm.

(2) Preparation of Titanium Dioxide Precursor

Titanium isopropoxide (TTIP) and γ-aminopropyl triethoxysilane (APTES) were mixed to prepare amino titanosiloxane.

(3) Preparation of Photocatalyst

Figure 2A:
FIGS. 2A, 2B, 3A, 3B, 4A and 4B are scanning electron microscope (SEM) images of photocatalysts ($TiO_2$/PU) in which titanium dioxide is dispersed in a polyurethane matrix, and scanning electron microscope (SEM) images of photocatalysts (V—$TiO_2$/PU) prepared in Examples 2 to 6.

The polyurethane matrix resin activated in (1) and the amino titanosiloxane as the titanium dioxide precursor prepared in (2) were mixed to prepare a photocatalyst ($TiO_2$/PU) in which titanium dioxide was dispersed in the polyurethane matrix. This can be confirmed through FIG. 2A. Specifically, FIG. 2A is a scanning electron microscope (SEM) image of the photocatalyst ($TiO_2$/PU) in which titanium dioxide was dispersed in the polyurethane matrix.

Next, the photocatalyst in which titanium dioxide was dispersed in the polyurethane matrix was doped with 0.1 mole of ammonium metavanadate ($NH_4VO_3$) as the transition metal precursor, and irradiated with UV rays for 5 hours, and then calcined at 200° C. for 5 hours under a nitrogen atmosphere to prepare a photocatalyst (V—$TiO_2$/PU) in which vanadium-doped titanium dioxide was dispersed in the polyurethane matrix.

In this case, the content of the vanadium-doped titanium dioxide (V—$TiO_2$) was adjusted, based on 100 parts by weight of the polyurethane matrix (PU), as listed in the following Table 1 by adjusting amounts of the titanium dioxide precursor and the ammonium metavanadate.

TABLE 1

|  | V-$TiO_2$ (parts by weight) |
| --- | --- |
| Example 2 | 2 |
| Example 3 | 4 |
| Example 4 | 6 |
| Example 5 | 8 |
| Example 6 | 10 |

In this case, the scanning electron microscope (SEM) images of the photocatalysts (V—$TiO_2$/PU) prepared in Examples 2 to 6 are photographed and shown in FIGS. 2 to 4 below.

Figure 2B:
Figure 3A:
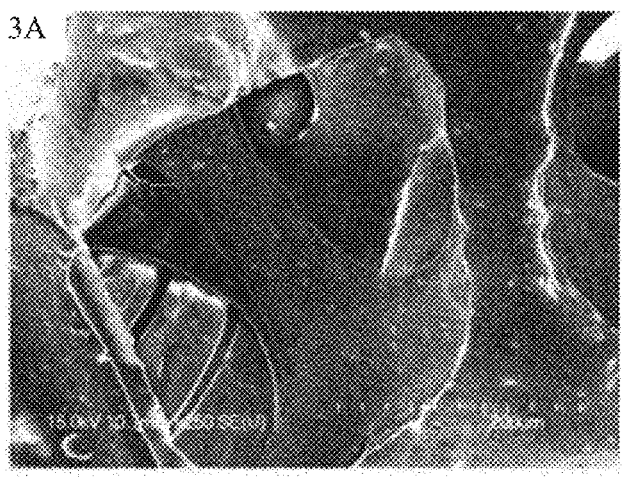
Figure 3B:
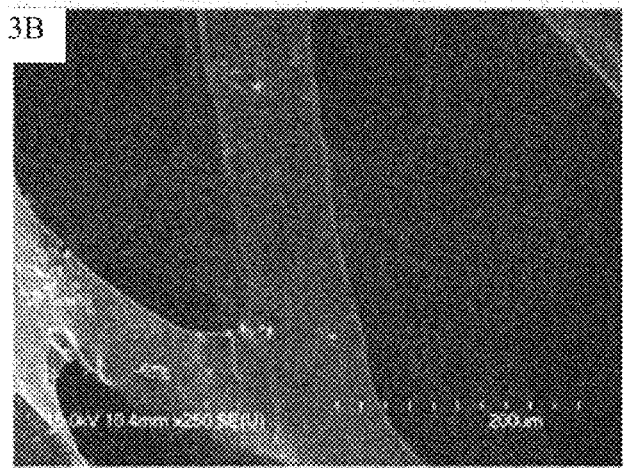
Figure 4A:
Figure 4B:

Specifically, the image of the photocatalyst prepared in Example 2 is shown in FIG. 2B, the image of the photocatalyst prepared in Example 3 is shown in FIG. 3A, the image of the photocatalyst prepared in Example 4 is shown in FIG. 3B, the image of the photocatalyst prepared in Example 5 is shown in FIG. 4A, and the image of the photocatalyst prepared in Example 6 is shown in FIG. 4B.

As a result, it can be seen that the titanium dioxide and vanadium were almost uniformly distributed on the polyurethane matrix.

Comparative Example 1

Titanium dioxide ($TiO_2$) was commercially available and prepared as the photocatalyst.

Comparative Example 2

Distilled water (120 mL) in which 1% by weight of cobalt nitrate was dissolved was added to a 250 mL flask, and titanium isopropoxide (TIP, 7.44 mL) and acetic acid (14.32 mL) were added thereto, and then stirred for an hour. Thereafter, 0.5 M sodium borohydride ($NaBH_4$, 2 mL) was added dropwise to the flask, and stirred for 20 minutes. When it was confirmed that a white solid was formed, the white solid was filtered, and the filtrate was washed with distilled water. Then, the washed filtrate was dried to obtain cobalt-doped titanium dioxide (Co—$TiO_2$) as the photocatalyst.

Comparative Example 3

A dispersion (5 mL) in which an oxidized graphene oxide (GO, 20 mg) was dispersed, and cetyl trimethylammonium bromide (CTAB, 0.5 g) were added to ethanol (30 mL), and stirred at room temperature for 30 minutes to prepare a solution A in which graphene oxide was dispersed.

Next, separately, titanium isopropoxide (TIP; 7.44 mL) and acetic acid (14.32 mL) were added to a 250 mL flask, and stirred for an hour. Thereafter, 0.5 M sodium borohydride ($NaBH_4$, 2 mL) was added dropwise to the flask, and stirred for 20 minutes to prepare a solution B in which titanium dioxide was dispersed.

The solution B was added dropwise to the previously prepared solution A, and distilled water (20 mL) was added thereto, and then stirred at room temperature for 12 hours.

Subsequently, the resulting solution was filtered, and the filtrate was washed with distilled water, and dried overnight at 80° C. to obtain a graphene oxide ($TiO_2$/GO) on which the titanium dioxide was supported. Then, the resulting graphene oxide was sintered at 500° C. for 5 minutes to obtain a reduced graphene oxide ($TiO_2$/rGO), on which the titanium dioxide was supported, as the photocatalyst.

Comparative Example 4

A photocatalyst ($TiO_2$/PU) was prepared in the same manner as in Example 2, except that the titanium dioxide was not additionally doped with vanadium in (3) of Example 2.

Experimental Example 1

To check components of the photocatalyst including the reduced graphene oxide as the support, experiments was performed as follows.

To determine a shape and component content of the photocatalyst, the photocatalyst prepared in Example 1 was photographed using a scanning electron microscope (SEM), and the component content of the photocatalyst was continuously measured using energy dispersive X-ray spectroscopy (EDX) while photographing the photocatalyst using the scanning electron microscope (SEM). Also, binding properties between the components constituting the photocatalyst were confirmed to measure the X-ray photoelectron spectroscopy (XPS) spectra of the photocatalysts prepared in Example 1 and Comparative Examples 1 to 3. The results of measurements are shown in FIGS. 5 to 8.

Figure 5:
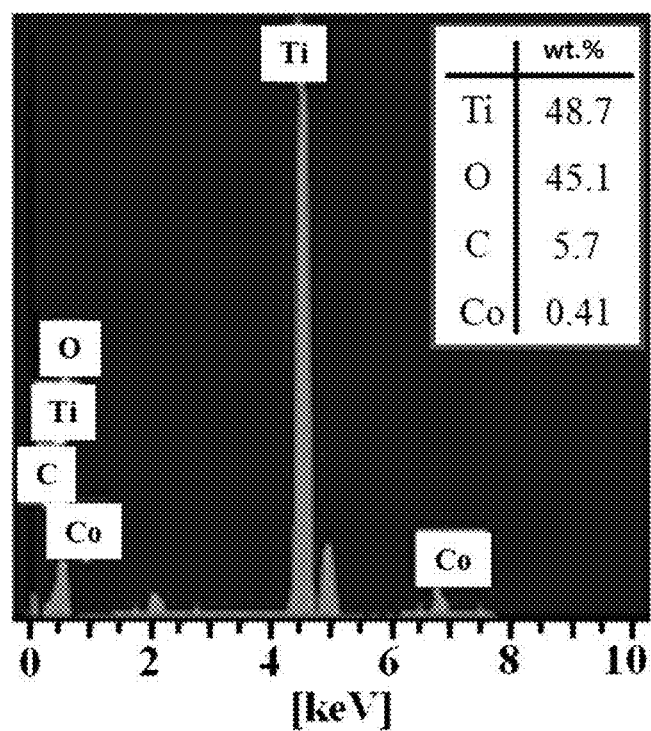
FIG. 5 is a graph of measuring the photocatalyst (Co—$TiO_2$/rGO) prepared in Example 1 using energy dispersive X-ray spectroscopy (EDX).
Figure 6:
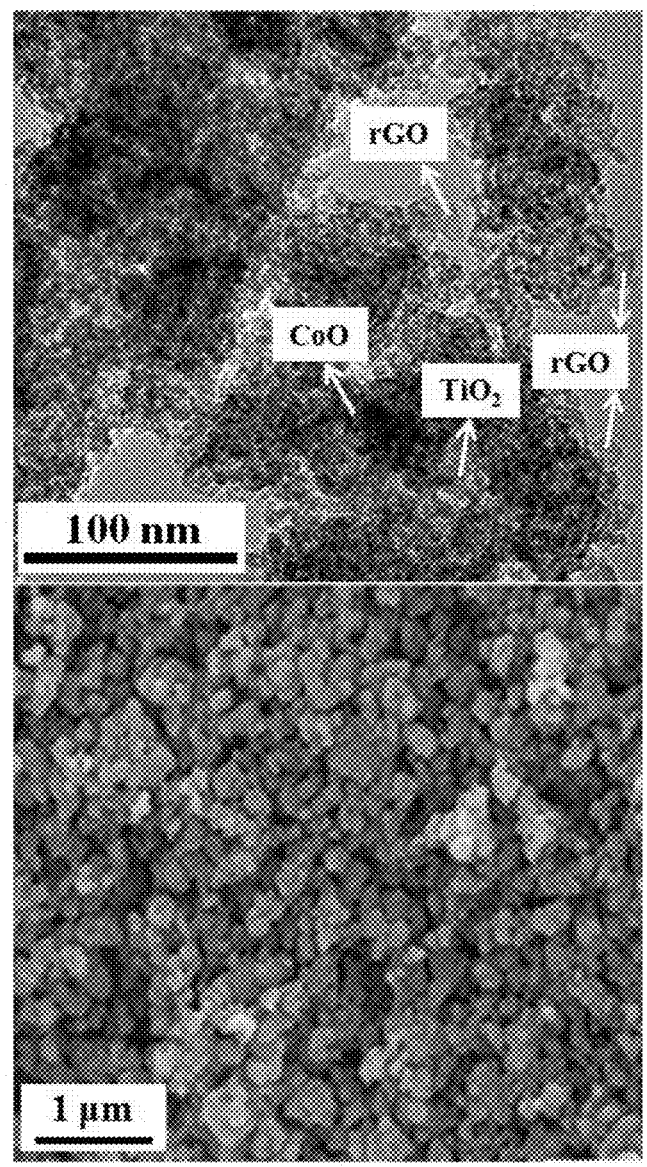
FIG. 6 is a scanning electron microscope (SEM) image of a photocatalyst (Co—$TiO_2$/rGO) prepared in Example 1.

Referring to FIGS. 5 and 6, it can be seen that the photocatalysts according to the present invention had a structure in which the cobalt (Co)-doped, uniform titanium dioxide particles having an average diameter of approximately 150 to 200 nm were supported on and fixed to a surface of the graphene oxide. Also, it was confirmed that the photocatalysts thus formed included 48.5±1% by weight of a titanium element, 45±1% by weight of an oxygen element, 6±1% by weight of a carbon element, and 0.45±0.1% by weight of a cobalt element.

Figure 7:
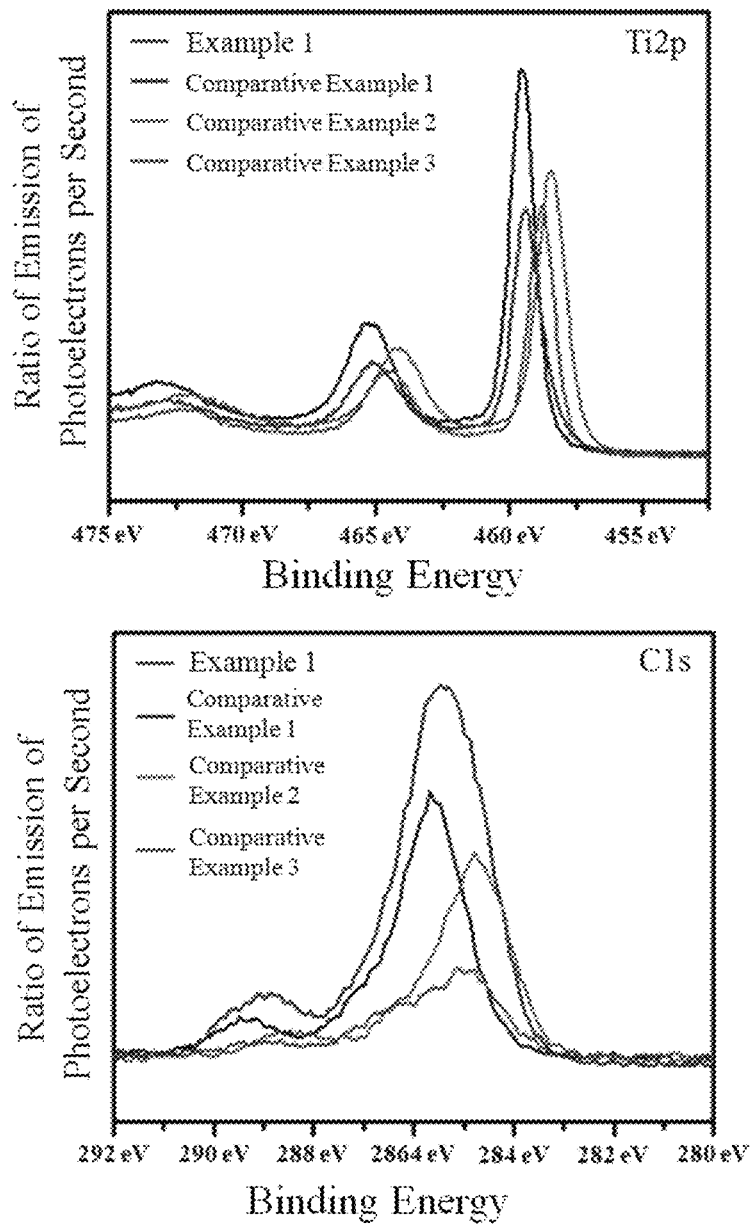
FIGS. 7 and 8 are graphs of measuring the X-ray photoelectron spectroscopy (XPS) spectra of the photocatalysts (Co—$TiO_2$/rGO) prepared in Example 1 and Comparative Examples 1 to 3.
Figure 8:
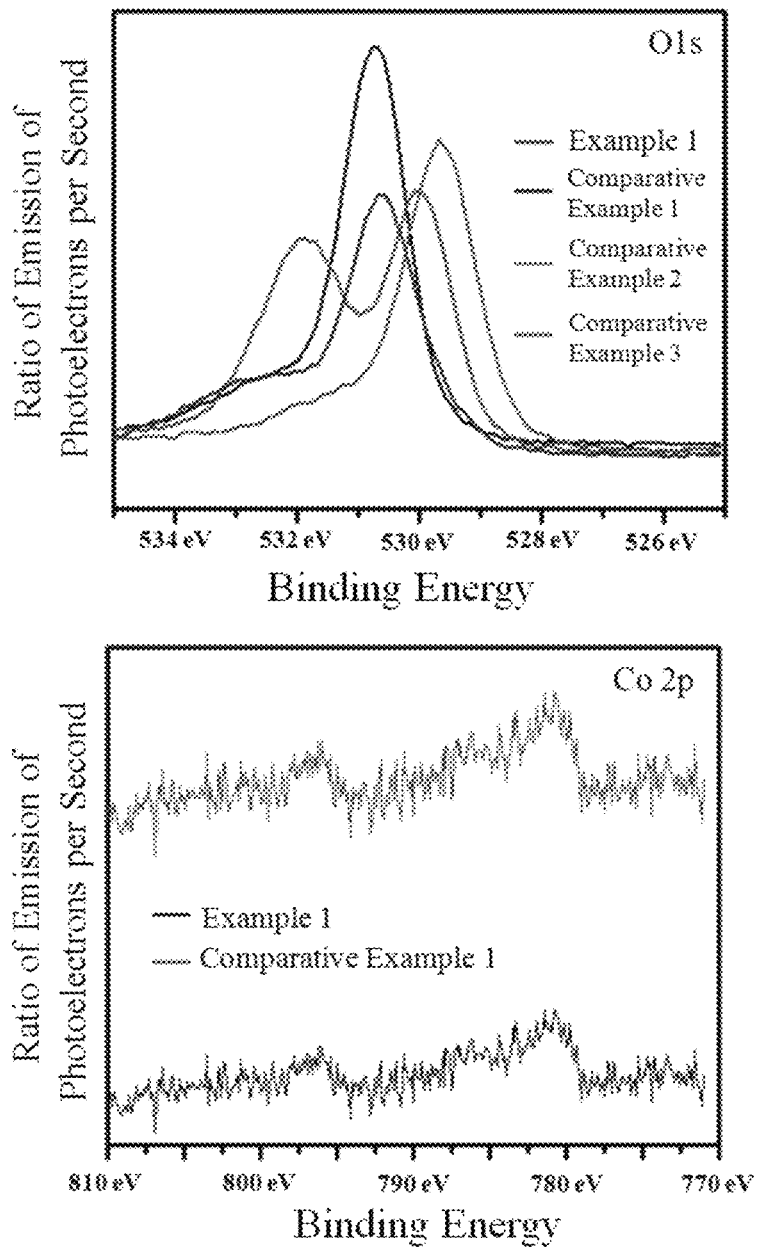

Referring to FIGS. 7 and 8, it was revealed that the photocatalyst prepared in Example 1 had smaller Ti2p and O1s binding energies, which are able to confirm a binding property of each of the titanium and oxygen elements, compared to the photocatalysts prepared in Comparative Examples 1 to 3. This indicated that the titanium element of titanium dioxide in the photocatalyst of Example 1 was chemically bound to carbon of the reduced graphene oxide to relatively reduce the binding energy between the titanium and oxygen elements.

Also, it can be seen that the photocatalysts prepared in Example 1 and Comparative Example 2 had a Co2p binding energy, which is able to confirm a binding property of cobalt (Co), in a high spin state, and that the photocatalysts had weak doublet peaks at binding energies of approximately 796±2 eV and approximately 781±2 eV. Here, it can be seen that the peaks were observed for $Co^{2+}$ and $Co^{3+}$, indicating that the titanium dioxide as the photocatalyst was doped with cobalt so that an oxygen element of the titanium dioxide was chemically bound to cobalt.

From these results, it can be seen that the photocatalyst according to the present invention included titanium dioxide ($TiO_2$) having photocatalytic activity as a main ingredient and also included cobalt and a reduced graphene oxide, and had a structure in which titanium dioxide in the form of particles was supported on and fixed to a surface of the reduced graphene oxide (rGO). Also, it can be seen that the cobalt formed a chemical bond with the oxygen element of titanium dioxide, and the titanium element of titanium dioxide formed a chemical bond with the carbon element of graphene oxide and/or the oxygen element bound to the carbon element.

Experimental Example 2

To check components of the photocatalyst including the polymer matrix as the support, experiments were performed as follows.

(1) Vanadium (V)

The high-resolution XPS spectra of V2p3/2 peaks of the photocatalyst (V—$TiO_2$/PU) prepared in Examples 2 to 6 were measured. The results are shown in FIG. 9.

Figure 9:
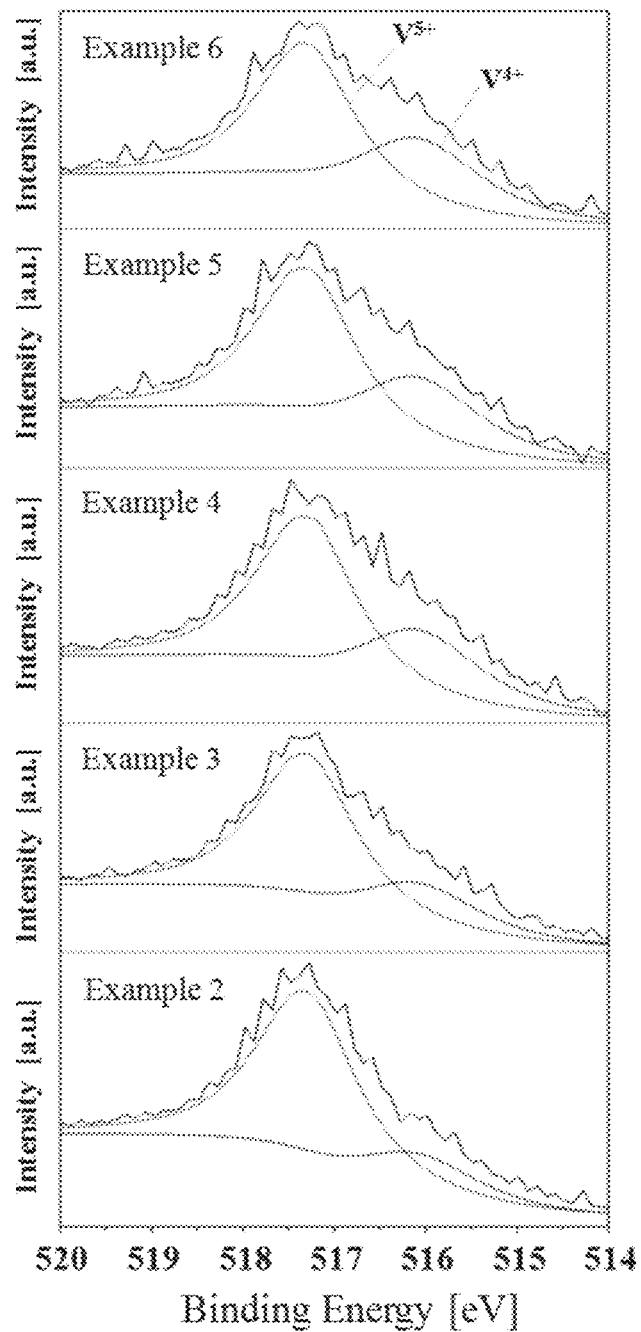
FIG. 9 is a graph of measuring the high-resolution XPS spectra of V 2p3/2 peaks of the photocatalysts (V—$TiO_2$/PU) prepared in Examples 2 to 6.

Referring to FIG. 9, two V 2p3/2 peaks were observed at 516.0±2 and 517.4±2 eV in the case of the photocatalyst (V—$TiO_2$/PU), the values of which represent V2p3/2 binding energies in $V^{4+}$ and $V^{5+}$ states. The $V^{5+}$ state in the photocatalyst (V—$TiO_2$/PU) corresponded to a state of vanadium oxide ($V_2O_5$) formed from the transition metal precursor ($NH_4VO_3$) during a production process. On the other hand, $V^{4+}$ was formed by reducing $V^{5+}$. The reduction of $V^{5+}$ may occur due to oxidation by oxalic acid under the influence of the temperature during UV irradiation and sintering processes. Because the $V^{4+}$ (72 Å) had a diameter similar to the $Ti^{4+}$ (74 Å), the $V^{4+}$ replaced sites of $Ti^{4+}$ ions at Ti—O—V bonds so that the $V^{4+}$ may be included in a titanium dioxide ($TiO_2$) lattice. Therefore, the titanium dioxide ($TiO_2$) lattice may be doped with vanadium in $V^{4+}$ and $V^{5+}$ states in the photocatalyst (V—$TiO_2$/PU). In this case, the $V^{4+}/V^{5+}$ ratio in the photocatalyst (V—$TiO_2$/PU) is proportional to a $V^{4+}$ peak region/a $V^{5+}$ peak region on the X-ray photoelectron spectroscopy spectra. Also, it can be seen that the $V^{4+}/V^{5+}$ ratio suddenly increases with an increase in content of the vanadium-doped titanium dioxide (V—$TiO_2$), and is gradually stabilized as the content of the vanadium-doped titanium dioxide (V—$TiO_2$) reaches 6 parts by weight.

(2) Titanium (Ti)

The high-resolution XPS spectra of Ti 2p3/2 peaks of the photocatalysts (V—$TiO_2$/PU) prepared in Examples 2 to 6 and Comparative Example 4 were measured. The results are shown in FIG. 10.

Figure 10:
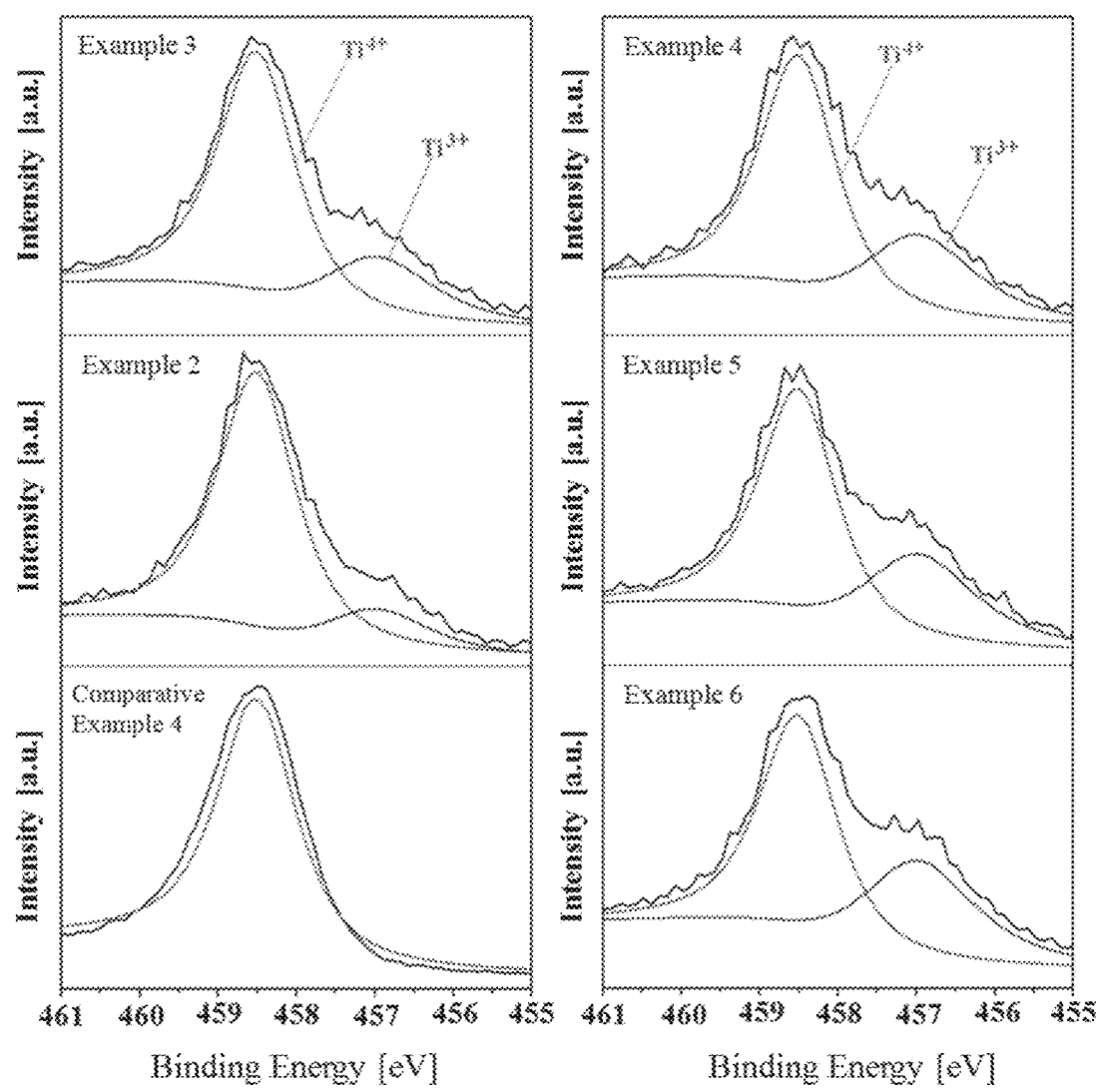
FIG. 10 is a graph of measuring the high-resolution XPS spectra of Ti 2p3/2 peaks of the photocatalysts (V—$TiO_2$/PU) prepared in Examples 2 to 6 and Comparative Example 4.

Referring to FIG. 10, it can be seen that the photocatalysts (V—$TiO_2$/PU) were prepared to include both $Ti^{4+}$ and $Ti^{3+}$. Here, $Ti^{3+}$ formation may occur due to a doping effect of $V^{4+}$. The $V^{4+}$ shares titanium and oxygen atoms in the titanium dioxide ($TiO_2$) lattice to have oxygen vacancies in the lattice so as to form a Ti—O—V bond. The oxygen vacancies in the titanium dioxide ($TiO_2$) lattice mainly cause the reduction of $Ti^{4+}$ into $Ti^{3+}$. The tendency of the photocatalyst (V—$TiO_2$/PU) to contain $Ti^{3+}$ suddenly increases with an increase in content of the vanadium-doped titanium dioxide (V—$TiO_2$), and is gradually stabilized as the content of the vanadium-doped titanium dioxide (V—$TiO_2$) reaches 6 parts by weight, which is similar to that of $V^{4+}$. This indicates that the inclusion of some amount of $V^{4+}$ in the titanium dioxide ($TiO_2$) lattice induces $Ti^{3+}$ formation in the lattice. Also, an electron number of $Ti^{3+}$ is 19, which is higher than $Ti^{4+}$ whose electron number is 18. As a result, it can be seen that the $Ti^{3+}$ is more easily excited, compared to the $Ti^{4+}$. Therefore, it can be seen that the V photocatalyst (V—$TiO_2$/PU) having a high $Ti^{3+}/Ti^{4+}$ ratio may have a high electron yield.

In this case, the $V^{4+}/V^{5+}$ ratios and $Ti^{3+}/Ti^{4+}$ ratios measured in FIGS. 9 and 10 are listed in the following Table 2.

TABLE 2

|  | $V^{4+}/V^{5+}$ ratio | $Ti^{3+}/Ti^{4+}$ ratio |
|---|---|---|
| Example 2 | 15.5 | 12.3 |
| Example 3 | 24.3 | 18.5 |
| Example 4 | 35.4 | 30.1 |
| Example 5 | 38.2 | 32.2 |
| Example 6 | 40.8 | 33.6 |
| Comparative Example 4 | — | 0 |

Experimental Example 3

To evaluate optical properties of the photocatalyst according to the present invention including the reduced graphene oxide as the support, experiments were performed as follows.

Figure 11:
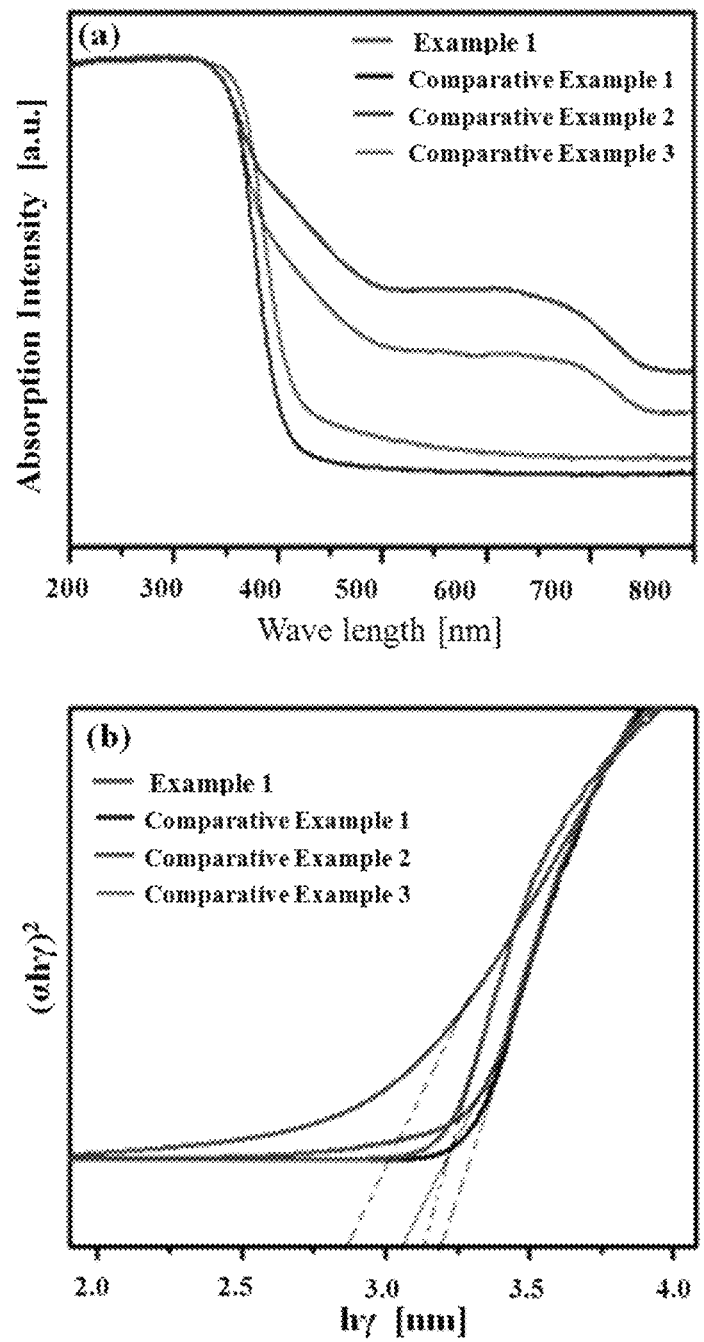
FIG. 11 is a graph illustrating light absorbance and band gap energy of the photocatalysts prepared in Example 1 and Comparative Examples 1 to 3: where (A) is a graph illustrating the light absorbance according to wavelength, and (B) is a graph illustrating the band gap energy.

The light absorbance and band gaps of the photocatalysts prepared in Example 1 and Comparative Examples 1 to 3 were measured in a wavelength region of 200 to 800 nm using a UV-Vis spectrometer (Light source: Xenon lamp, and Power output: 20 to 200 W). The results of measurement are shown in FIG. 11 and listed in Table 3.

TABLE 3

|  | Band gap energy [eV] |
|---|---|
| Example 1 | 2.83 |
| Comparative Example 1 | 3.21 |
| Comparative Example 2 | 3.15 |
| Comparative Example 3 | 3.07 |

FIG. 11(A) is a graph illustrating the light absorbance of the photocatalysts according to a change in wavelength, and FIG. 11(B) is a graph illustrating the band gap energy of the photocatalysts.

Referring to FIG. 11(A), it was revealed that the photocatalysts prepared in Example 1 and Comparative Examples 1 to 3 had a light absorption intensity of approximately 90% or more in a wavelength of 350 nm or less, and the light absorption intensity was reduced with an increase in wavelength in a wavelength region greater than 350 nm. However, it was confirmed that the photocatalysts prepared in Comparative Examples 1 to 3 had average light absorption intensities of approximately 15%, approximately 35% and approximately 20% at a wavelength of 500 nm or more, respectively, but the photocatalyst of Example 1 had an average light absorption intensity of approximately 43% or more. This indicates that the excited photon energy of the photocatalyst of Example 1 is reduced, and electrons easily undergo 'charge transition.'

Also, referring to FIG. 11(B) and Table 3, it was revealed that the photocatalysts of Comparative Examples 1 to 3 had band gaps of approximately 3.21 eV, approximately 3.15 eV and approximately 3.07 eV, respectively, but the photocatalyst of Example 1 has a band gap of approximately 2.83 eV. This indicates that the photocatalyst according to the present invention exhibits excellent photocatalytic efficiency even when the photocatalyst is irradiated with light having low energy such as visible light.

From these results, it can be seen that the photocatalyst according to the present invention has an excellent photocatalytic effect even in a visible light region having a wavelength region of 400 to 800 nm.

Experimental Example 4

To evaluate the physical properties of the photocatalyst of the present invention including the polymer matrix as the support, experiments were performed as follows.

The BET specific surface areas, band gaps and light absorbance of the photocatalyst (V—$TiO_2$/PU) prepared in Examples 2 to 6 and the photocatalyst ($TiO_2$/PU) prepared in Comparative Example 4 were measured. A method of measurement was as described below. The results are listed in the following Table 4 and shown in FIG. 12.

1) Method of measurement of BET specific surface area: The BET specific surface area is measured using a nitrogen adsorption-desorption method.

2) Method of measurement of band gap: The band gap is measured at a point at which a straight line in a section almost close to the straight line in the vicinity of an absorption edge is extended to intercept the X axis in a Tauc plot in which an energy value (E) with respect to wavelength is represented by the X axis, and the square root of a value calculated by multiplying an energy value by a value, which is obtained by converting diffuse reflectance (R) according to the Kubelka-Munk theory, is represented by the Y axis.

3) Light absorbance: The UV-Vis absorption spectra of a photocatalyst are measured in a wavelength range of 300 to 700 nm.

TABLE 4

|  | Average BET specific surface area [m²/g] | Band gap [eV] |
|---|---|---|
| Example 2 | 131.7 | 3.09 |
| Example 3 | 156.3 | 2.93 |
| Example 4 | 192.5 | 2.83 |
| Example 5 | 186.7 | 2.76 |
| Example 6 | 180.2 | 2.76 |
| Comparative Example 4 | 110.9 | 3.20 |

Referring to Table 4, it can be seen that the photocatalysts prepared in the examples of the present invention had considerably high average BET specific surface areas, compared to the photocatalyst prepared in the comparative example. In particular, it can be seen that the photocatalyst (V—$TiO_2$/PU) of Example 4 in which the content of the vanadium-doped titanium dioxide (V—$TiO_2$) was 6 parts by weight had the highest BET specific surface area of 192.5 m²/g.

Also, it can be seen that, as the content of the vanadium-doped titanium dioxide (V—$TiO_2$) increased, the band gaps of the photocatalysts (V—$TiO_2$/PU) according to the present invention were reduced, compared to the band gap (3.2 eV) of the photocatalyst prepared in the comparative example.

Figure 12:
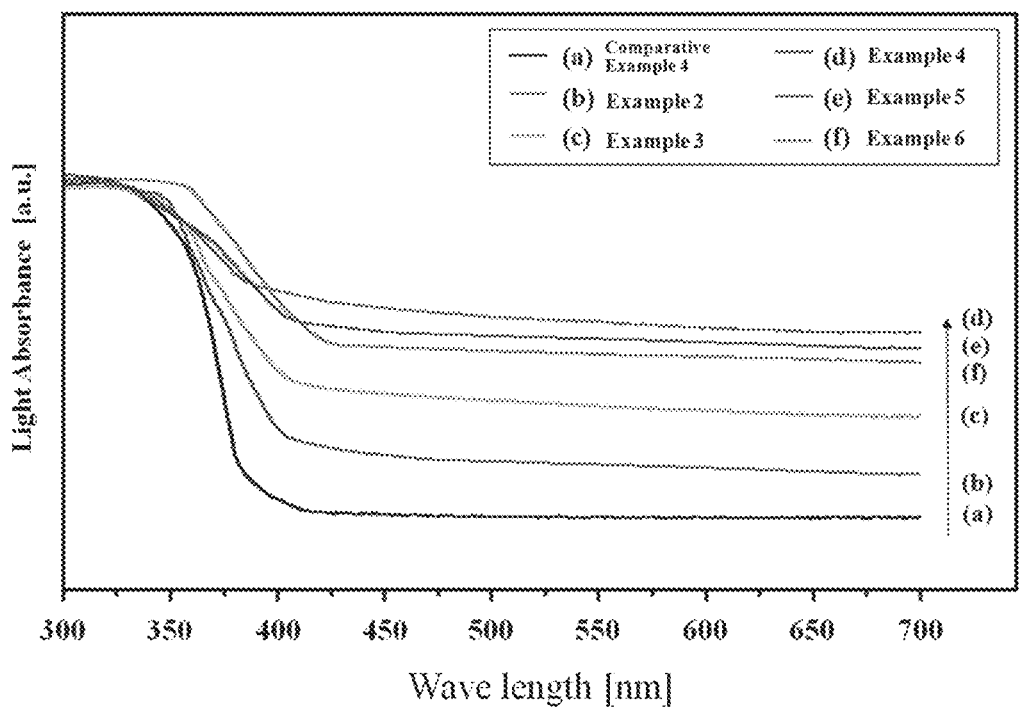
FIG. 12 is a graph of measuring light absorbance according to wavelength of the photocatalysts prepared in Examples 2 to 6 and Comparative Example 4 in a wavelength range of 300 to 700 nm.

Referring to FIG. 12, it can also be seen that the light absorbance decreased at 370 nm or higher, which is in a UV wavelength region. However, it can also be seen that a decrease in the light absorbance of the photocatalysts prepared in Examples 2 to 6 of the present invention, particularly the photocatalyst prepared in Example 4, was significantly impeded, compared to the photocatalyst of the comparative example. It can be seen that these results are due to light absorption properties of vanadium (V) particles with which a surface of titanium dioxide ($TiO_2$) was doped.

As a result, it can be seen that the light absorbance in a visible light region is remarkably improved due to the vanadium (V) particles.

Experimental Example 5

To evaluate water treatment efficiency according to water treatment conditions and water treatment efficiency according to types of photocatalysts under the optimum conditions when the photocatalyst according to the present invention including the reduced graphene oxide as the support was used for water treatment of waste water containing organic compounds, experiments were performed as follows.

(1) Evaluation of Organic Compound Removal Efficiency According to pH of Aqueous Solution An aqueous solution (100 mL) containing 2-chlorophenol (CP) as the organic compound at a concentration of 10 mg/L, and each of the photocatalysts (50 mg) prepared in Example 1 and Comparative Examples 1 to 3 were added to a 250 mL flask, and then irradiated with light using a xenon lamp (Wavelength: 390 to 820 nm, and Power output: 100 W) while stirring for 8 hours to remove the organic compound in the aqueous solution. Thereafter, the photocatalyst was filtered, and a concentration of the organic compound in the resulting filtrate was measured to calculate an organic compound removal rate. In this case, the pH value of the aqueous solution was adjusted by units of pH 1.0 in a pH range of pH 3 to 10. The results of calculation are shown in FIG. 13.

Figure 13:
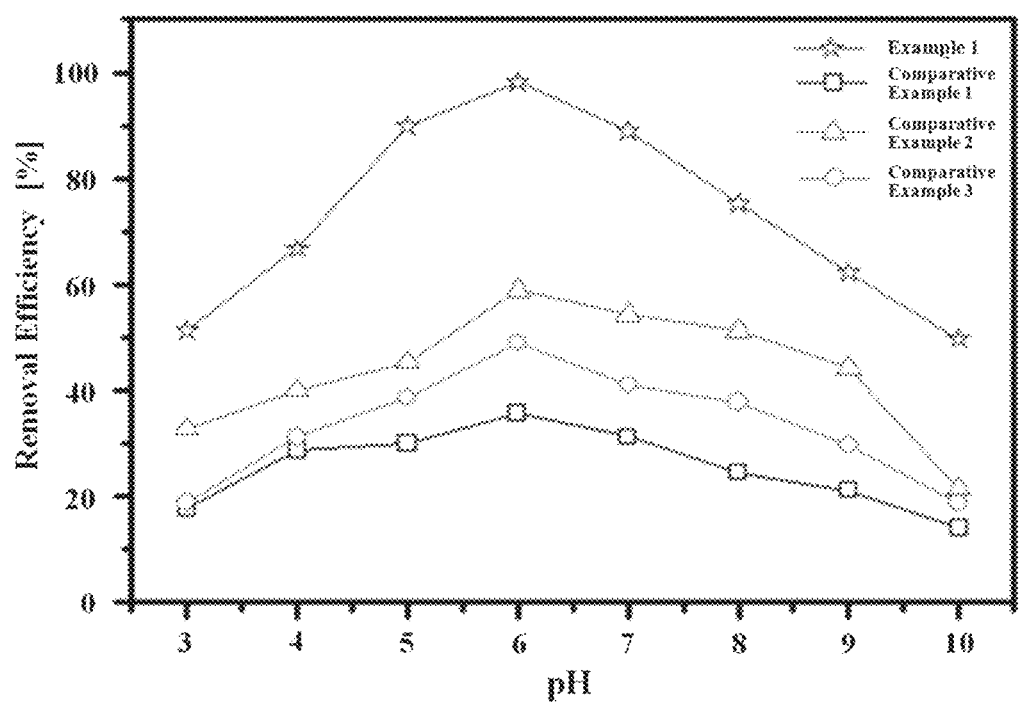
FIG. 13 is a graph illustrating the removal efficiency of an organic compound according to pH value of the photocatalysts prepared in Example 1 and Comparative Examples 1 to 3.

Referring to FIG. 13, it was revealed that the photocatalyst according to the present invention removed the organic compound in the aqueous solution at a high removal rate.

Specifically, the method of removing an organic compound according to the present invention had a removal rate of approximately 60% or more in a range of pH 4 to 8, and particularly had a high removal rate of approximately 80% or more in a range of pH 5 to 7 when the organic compound present in water was 2-chlorophenol (2-CP).

From these results, it can be seen that the method of removing an organic compound according to the present invention had high water treatment efficiency when the pH value of the aqueous solution was adjusted to pH 5 to 7 to remove the organic compound present in water.

(2) Evaluation of Organic Compound Removal Efficiency According to Water Treatment Time An aqueous solution (100 mL, pH 6) containing 2-chlorophenol (CP) as the organic compound, and each of the photocatalysts (50 mg) prepared in Example 1 and Comparative Examples 1 to 3 were added to a 250 mL flask, and then irradiated with light using a xenon lamp (Wavelength: 390 to 820 nm, and Power output: 100 W) while stirring for 12 hours to remove the organic compound in the aqueous solution. In this case, the organic compound removal rate was calculated by sampling the aqueous solution to which each of the photocatalysts was added at time intervals of 2 hours from the time point at which each of the photocatalysts were added, filtrating each of the photocatalysts, and measuring a concentration of the organic compound remaining in the resulting filtrate. Also, the concentration of the aqueous solution including 2-chlorophenol was adjusted to 10 mg/L, 20 mg/L, 40 mg/L, and 60 mg/L, and determined. The results of calculation are shown in FIG. 14.

Figure 14:
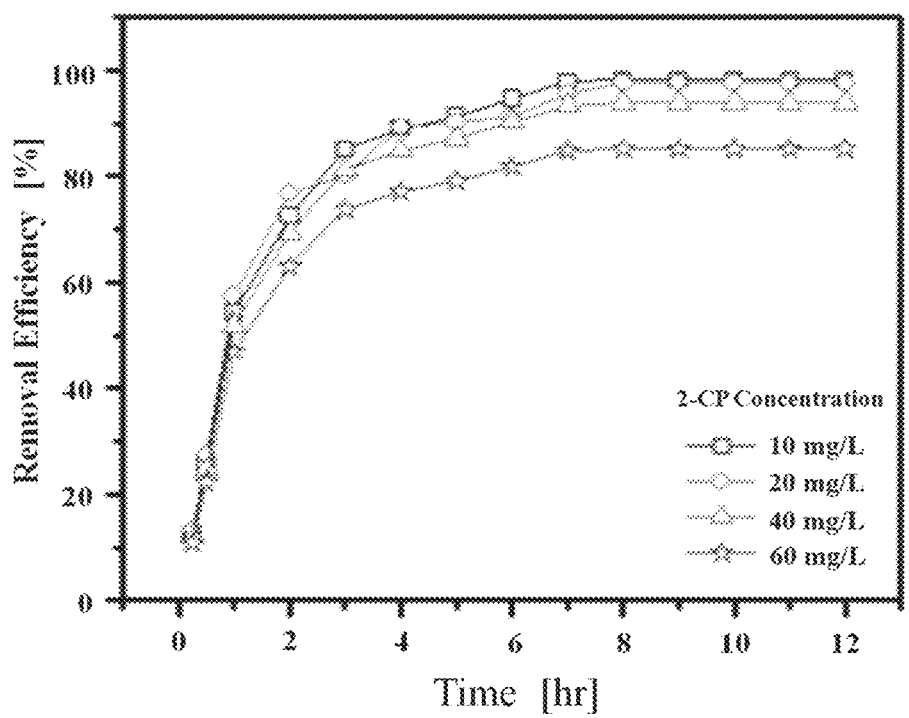
FIG. 14 is a graph illustrating organic compound removal efficiency over water treatment time according to a varying concentration of the organic compound in the photocatalyst prepared in Example 1.

Referring to FIG. 14, it was confirmed that the organic compound removal rate was approximately 45% or more after a treatment time of 2 hours or more has elapsed when the method of removing an organic compound according to the present invention was used to remove the organic compound present in water. Also, it was revealed that the organic compound removal rate increased with an increasing time at which the photocatalyst comes into contact with the organic compound remaining in the aqueous solution. It was confirmed that an increase in the removal rate slowed down after approximately 6 hours, and the high removal rate of approximately 80% or more was maintained regardless of the concentration of the 2-chlorophenol (2-CP) dissolved in the aqueous solution after 7 hours or more at which the organic compound comes into contact with the photocatalyst.

From the results, it can be seen that the method of removing an organic compound according to the present invention was used to remove the organic compound remaining in the aqueous solution with high efficiency when the water treatment was performed for 2 hours or more, specifically 6 hours or more, to remove the organic compound present in water.

(3) Evaluation of Organic Compound Removal Efficiency According to Amount of Radical Carrier Used An aqueous solution (100 mL, pH 6) containing 2-chlorophenol (CP) as the organic compound at a concentration of 100 mg/L and the photocatalyst (50 mg) prepared in Example 1 were added to a 250 mL flask, and then irradiated with light using a xenon lamp (Wavelength: 390 to 820 nm, and Power output: 100 W) while stirring for 600 minutes to remove the organic compound in the aqueous solution. Thereafter, the photocatalyst was filtered, and a concentration of the organic compound in the resulting filtrate was measured to calculate an organic compound removal rate. In this case, before the photocatalyst was added to the aqueous solution, hydrogen peroxide ($H_2O_2$, Concentration: 30 vol %), which is a radical carrier, was added at a content of 0.001, 0.01, 0.1, 0.5, and 1 parts by weight, based on 100 parts by weight of the aqueous solution containing the organic compound, and the removal rate of the aqueous solution was measured. In this case, the removal rate in an aqueous solution to which no hydrogen peroxide was added, which was used as the control, was also measured. The results of measurement are listed in the following Table 5 and shown in FIG. 15.

TABLE 5

|  | Amount of hydrogen peroxide added | 2-CP removal rate [%] |
| --- | --- | --- |
| Example 7 | 0.001 part by weight | 89.3 |
| Example 8 | 0.01 part by weight | 93.5 |
| Comparative Example 4 | 0.1 part by weight | 78.1 |
| Comparative Example 5 | 0.5 part by weight | 71.2 |
| Comparative Example 6 | 1 part by weight | 67.8 |
| Control | — | 81.2 |

Figure 15:
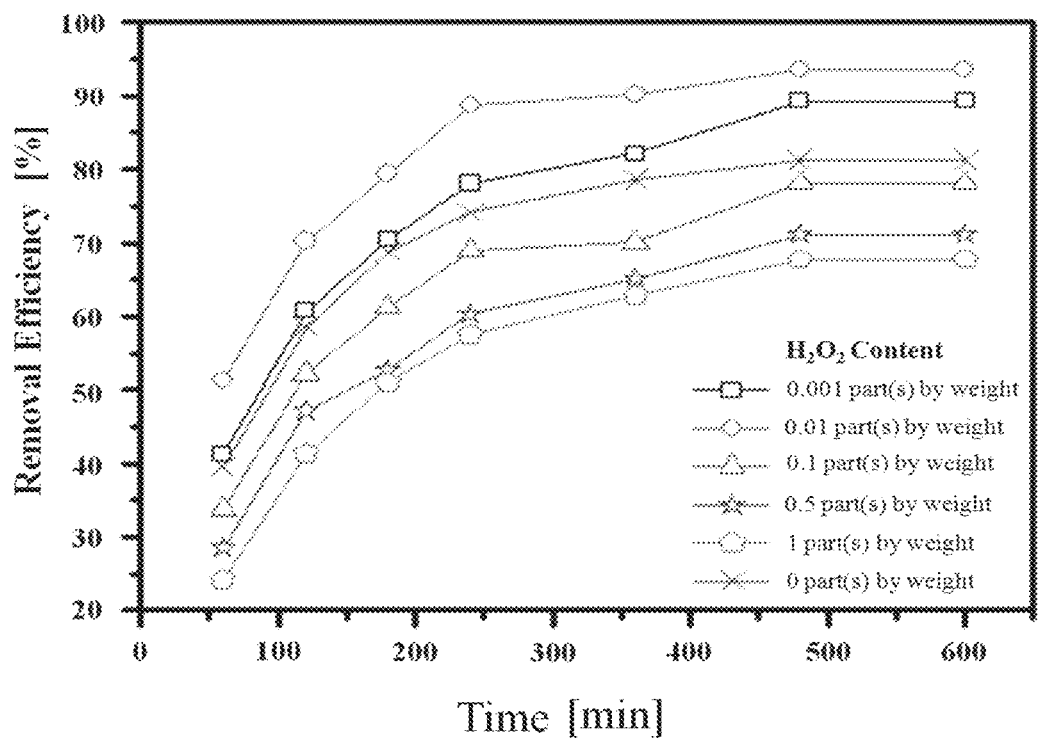
FIG. 15 is a graph illustrating organic compound removal efficiency according to the amount of hydrogen peroxide added to the photocatalyst prepared in Example 1.

Referring to Table 5 and FIG. 15, it was confirmed that, when hydrogen peroxide ($H_2O_2$) was added as the radical carrier at a content of 0.001 to 0.01 part by weight, the organic compound removal efficiency was improved, compared to the control to which no radical carrier was added. On the other hand, it was confirmed that the organic compound removal efficiency was reduced when the radical carrier was added at a content of 0.1 part by weight or more based on 100 parts by weight of the aqueous solution, compared to when the radical carrier was not added. This indicates that the radical carrier forms radicals when irradiated with light and serves to promote photodecomposition of the organic compound, but, when an excessive amount of the radical carrier is used, the residual radical carrier remaining after the formation of radicals reacts with radicals formed by light irradiation, resulting in degraded activity of the radicals.

From these results, it can be seen that the method of removing an organic compound according to the present invention may be effective in improving the organic compound removal efficiency in the aqueous solution when the radical carrier is added at a content of 0.0001 to 0.1 part by weight, based on 100 parts by weight of the aqueous solution containing the organic compound, to remove the organic compound present in water.

(4) Evaluation of Organic Compound Removal Efficiency According to Average Power Output Upon Light Irradiation An aqueous solution (100 mL, pH 6) containing 2-chlorophenol (CP) as the organic compound at a concentration of 100 mg/L and each of the photocatalysts (50 mg) prepared in Example 1 and Comparative Examples 1 to 3 were added to a 250 mL flask, and then irradiated with light using a xenon lamp (Wavelength: 390 to 820 nm) while stirring for 8 hours to remove the organic compound in the aqueous solution. Thereafter, each of the photocatalysts was filtered, and a concentration of the organic compound in the resulting filtrate was measured to calculate an organic compound removal rate. In this case, the average power output was adjusted to 20 W, 40 W, 60 W, 100 W and 200 W when the photocatalysts were irradiated with light. The results of calculation are shown in FIG. 16.

Figure 16:
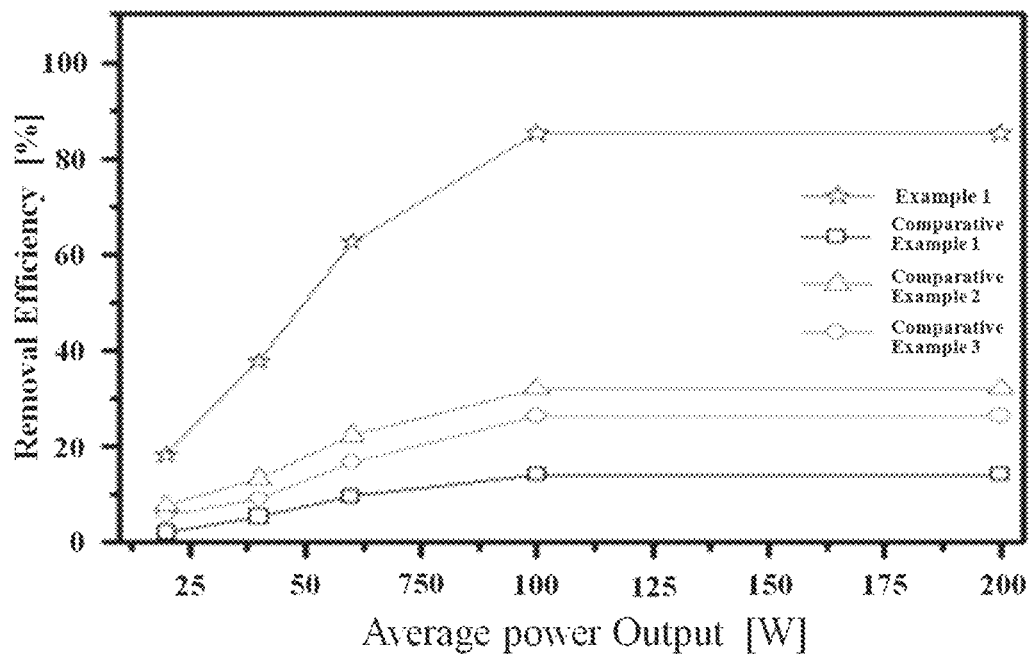
FIG. 16 is a graph illustrating organic compound removal efficiency according to average power output when the photocatalysts prepared in Example 1 and Comparative Examples 1 to 3 are irradiated with light.

Referring to FIG. 16, it was revealed that the photocatalyst of Example 1 exhibited an organic compound removal efficiency of approximately 60% or more at an average power output of 60 W, and an organic compound removal efficiency of approximately 85.2±2% at 100 W or more.

From these results, it can be seen that the method of removing an organic compound according to the present invention exhibited the excellent organic compound removal efficiency at an average power output of 50 W or more when the photocatalyst was irradiated with light to remove the organic compound present in water.

(5) Evaluation of Organic Compound Removal Efficiency According to Amount of Photocatalyst Used An aqueous solution (100 mL, pH 6) containing 2-chlorophenol (CP) as the organic compound at a concentration of 100 mg/L and the photocatalyst prepared in Example 1 were added to a 250 mL flask, and then irradiated with light using a xenon lamp (Wavelength: 390 to 820 nm, and Power output: 100 W)) while stirring for 600 minutes to remove the organic compound in the aqueous solution. Thereafter, the photocatalyst was filtered, and a concentration of the organic compound in the resulting filtrate was measured to calculate an organic compound removal rate. In this case, the photocatalyst was added at a content of 0.25 g to 3 g per 1 L of the aqueous solution. The results of calculation are listed in the following
Table 6 and shown in FIG. 17.

TABLE 6

| | Amount of photocatalyst used | 2-CP removal rate [%] |
|---|---|---|
| Example 9 | 0.5 g/L | 74.8 |
| Example 10 | 1 g/L | 89.2 |
| Example 11 | 2 g/L | 98.5 |
| Example 12 | 3 g/L | 98.5 |
| Comparative Example 7 | 0.25 g/L | 37.1 |

Figure 17:
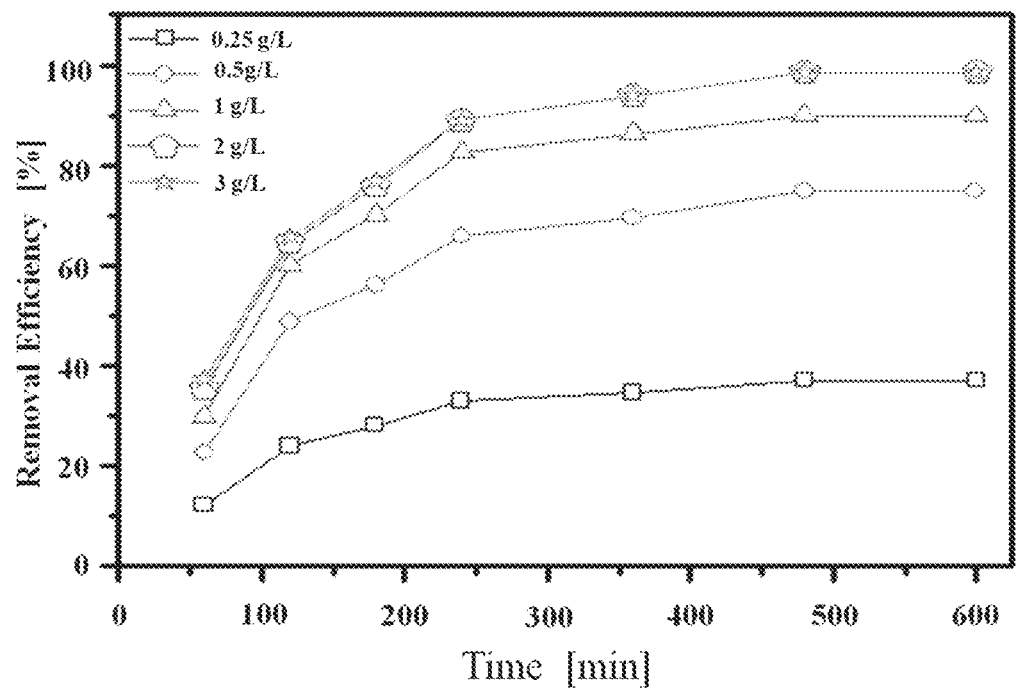
FIG. 17 is a graph illustrating organic compound removal efficiency over water treatment time according to a contact amount of the photocatalyst prepared in Example 1.

As shown in Table 6 and listed in FIG. 17, it was revealed that the method of removing an organic compound according to the present invention increased the organic compound removal rate when an increasing amount of the photocatalyst was added to the aqueous solution including the organic compound at a concentration of 100 mg/L so as to remove the organic compound present in water. Also, when 2 mg or more of the photocatalyst was added per 1 L of the aqueous solution, the organic compound removal rate was constantly maintained at approximately 98% or more when a water treatment time of 500 minutes had elapsed.

From these results, it can be seen that method of removing an organic compound according to the present invention was used to remove the organic compound with high efficiency when the organic compound was included at a content of 10 parts by weight or less, based on 1,000 parts by weight of the aqueous solution including the organic compound at a concentration of 100 mg/L.

Experimental Example 6

To evaluate the water treatment efficiency of the photocatalyst according to the present invention including the reduced graphene oxide as the support, experiments were performed as follows.

(1) Water Treatment Efficiency Evaluation 1

Figure 18:
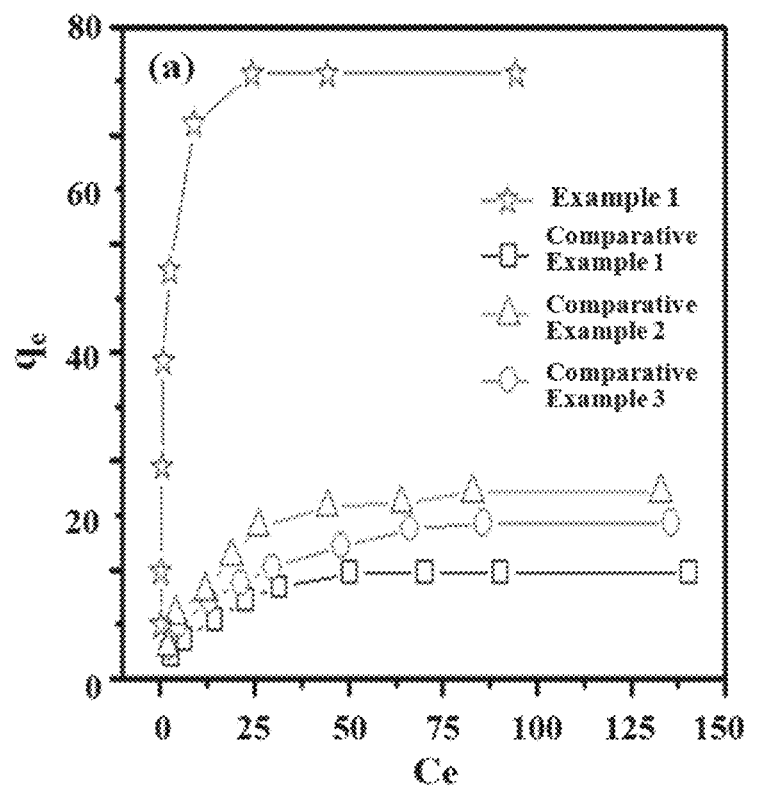
FIG. 18 is a graph illustrating equilibrium isotherm data upon photodecomposition of the photocatalysts prepared in Example 1 and Comparative Examples 1 to 3: where (A) shows the results obtained by a Langmuir's method, and (B) shows the results obtained by a Freundlich's method.
Figure 18:
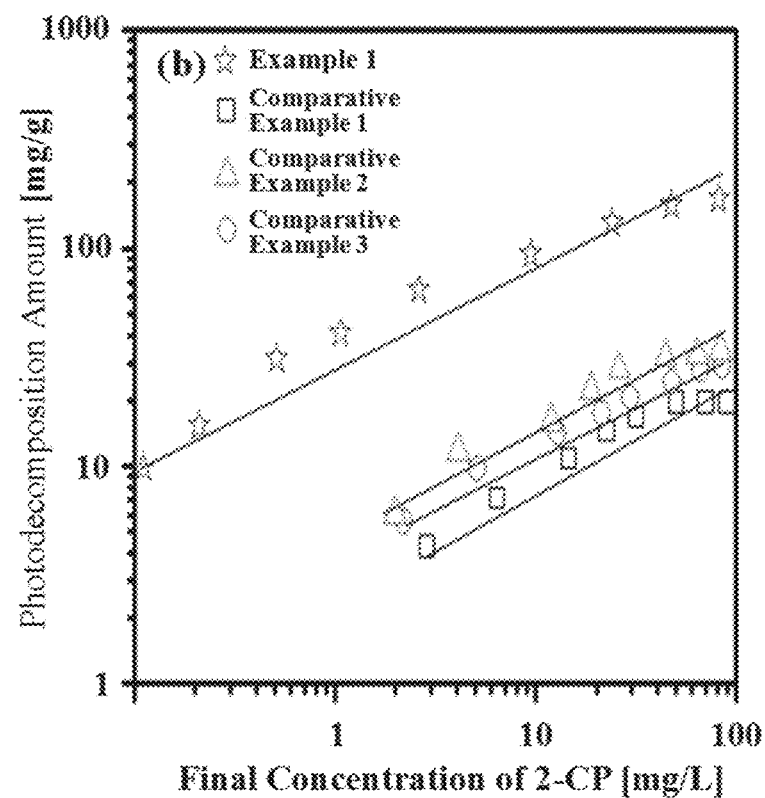

A 250 mL flask was installed at a place which was irradiated with natural light including ultraviolet light and visible light. Thereafter, distilled water (100 mL) in which 2-chlorophenol (2-CP, 5 to 150 ppm) was dissolved and each of the photocatalysts (50 mg) prepared in Example 1 and Comparative Examples 1 to 3 were added to the flask, and then stirred at 30±1° C. for 8 hours to perform a photodecomposition reaction. In this case, the pH value of the solution in which 2-chlorophenol (2-CP) was dissolved was pH 6, the wavelength of light during photodecomposition was in a range of 390 to 820 nm, and the power output was 100 W. The decomposition efficiency of 2-chlorophenol by the photodecomposition reaction was calculated according to the Langmuir adsorption isotherm and the Freundlich adsorption isotherm. The results are shown in FIG. 18.

Referring to FIG. 18(A), first, the photocatalyst prepared in Example 1 had an adsorption capacity of approximately 111.3±5 mg/g with respect to 2-chlorophenol (2-CP) remaining in the aqueous solution, whereas the photocatalysts prepared in Comparative Examples 1 to 3 had adsorption capacities of approximately 19.2±2 mg/g, 34.2±2 mg/g, and 28.4±2 mg/g, respectively.

Also, referring to FIG. 18(B), the photocatalyst prepared in Example 1 exhibited an adsorption isotherm with respect to 2-chlorophenol (2-CP) at a concentration of 100 mg/g or less. Also, it was confirmed that the removal rate increased as the concentration of the 2-chlorophenol decreased, and a time of 8±0.2 hours was taken to completely decompose 2-chlorophenol (2-CP) when the 2-chlorophenol (2-CP) was present at a concentration of 30 ppm.

(2) Water Treatment Efficiency Evaluation 2

First, as the photocatalyst, a reduced graphene oxide (Ni—TiO$_2$/rGO) on which nickel-doped titanium dioxide was supported was obtained in the same manner as in Example 1, except that nickel nitrate was used in Example 1 instead of the cobalt nitrate.

Next, an aqueous solution (100 mL, pH 6) including 2-chlorophenol (CP) as the organic compound was added to a 250 mL flask, and 50 mg of titanium dioxide (TiO$_2$); 50 mg of the photocatalyst (Co—TiO$_2$/rGO) prepared in Example 1; and 50 mg of the previously prepared photocatalyst (Ni—TiO$_2$/rGO) were added thereto. The aqueous solution to which the photocatalyst was added was irradiated with light using a xenon lamp (Wavelength: 390 to 820 nm, and Power output: 20 to 200 W) while stirring for 8 hours to remove the organic compound in the aqueous solution. In this case, the concentration of the aqueous solution including 2-chlorophenol was adjusted to 60 mg/L, and evaluated. The results of calculation are listed in Table 7 and shown in FIG. 19.

TABLE 7

| Type of photocatalyst | 2-CP removal rate at 100 W [%] |
| --- | --- |
| Co—TiO$_2$/rGO | 85.2 |
| Ni—TiO$_2$/rGO | 32.1 |
| TiO$_2$ | 14.1 |

Figure 19:
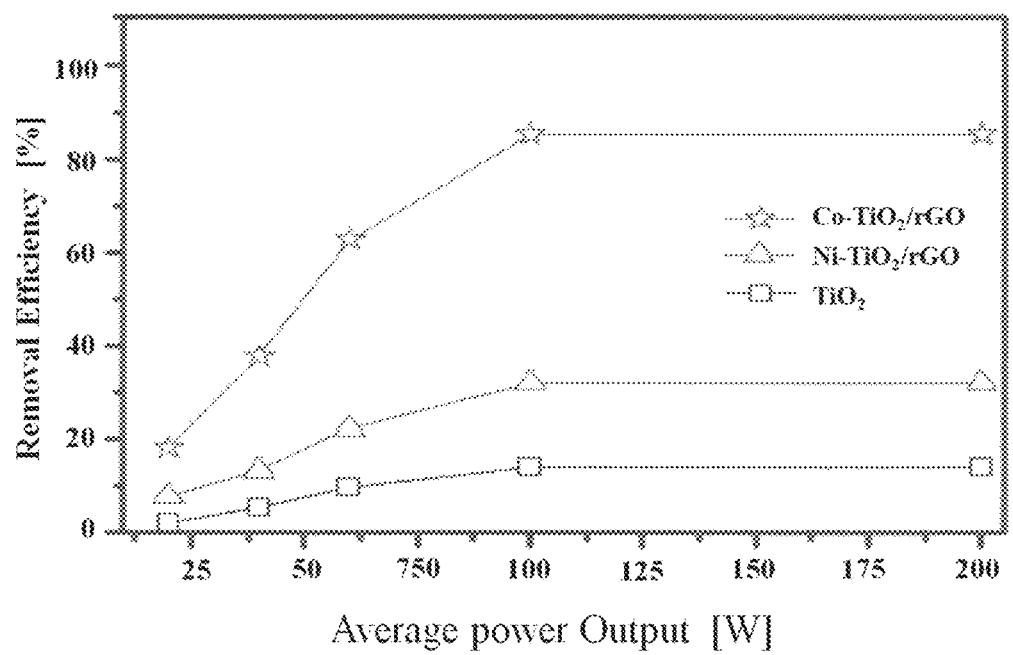
FIG. 19 is a graph illustrating organic compound removal efficiency according to average power output when different types of the photocatalysts are irradiated with light.

Referring to Table 7 and FIG. 19, it was revealed that, when the method of removing an organic compound according to the present invention was used to remove the organic compound present in water, the 2-chlorophenol (2-CP) removal rate was approximately 2.65 times higher when the photocatalyst (Co—TiO$_2$/rGO) including the cobalt-doped titanium dioxide was used, compared to when the photocatalyst (Ni—TiO$_2$/rGO) including titanium dioxide on which nickel was supported was used under the same conditions. This indicates that the cobalt-doped photocatalyst may provide optimized energy to form electrons and holes, which are used to decompose the organic compound under a condition of an average power output of 25 to 200 W.

From these results, it can be seen that the photocatalyst according to the present invention was very effective in photodecomposing the organic compound, which remained in the aqueous solution, in a wavelength region of 360 to 850 nm, which includes visible light, because the cobalt-doped titanium dioxide included the reduced graphene oxide.

Experimental Example 7

To evaluate an effect of the photocatalyst according to the present invention including the polymer matrix as the support on disposal of aromatic organic compounds present in the air, experiments were performed as follows.

A ratio (C/Co) of an amount of toluene in an injected gas/an amount of toluene in a discharged gas and a concentration of carbon dioxide (CO$_2$) over 0 to 330 seconds were measured with respect to the photocatalyst prepared in Example 4. In this case, the measurements were carried out at a dark condition until 150 seconds, and carried out at a visible light condition (0.025 W/cm$^2$) after 150 seconds. The results are listed in FIG. 20.

Figure 20:
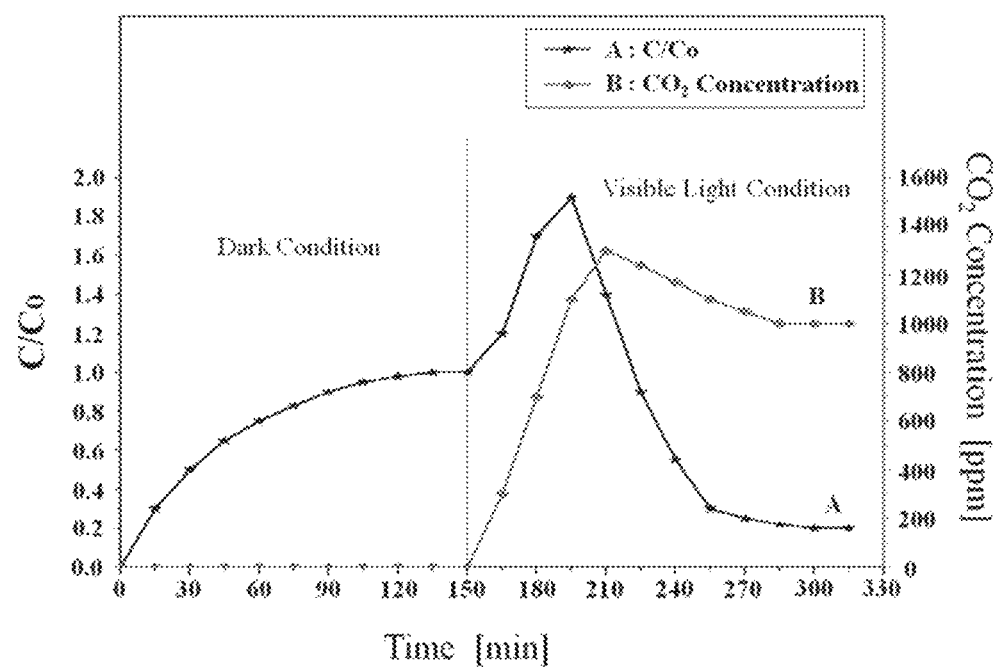
FIG. 20 shows the results of measuring a ratio (C/Co) of an amount of toluene in an injected gas/an amount of toluene in a discharged gas and a concentration of carbon dioxide ($CO_2$) over 0 to 330 minutes with respect to the photocatalyst prepared in Example 4.

Referring to FIG. 20, it can be seen that the C/Co ratio gradually increased until 150 seconds, and there was no change in concentration of carbon dioxide (CO$_2$). As a result, it was revealed that toluene was removed only by adsorption under a dark condition. In this case, the adsorption of toluene occurred through a direct electrostatic interaction between aromatic rings of toluene and ions such as Ti$^{3+}$, Ti$^{4+}$, V$^{4+}$ and V$^{5+}$ on a surface of the photocatalyst surface.

Experimental Example 8

To evaluate an effect of the photocatalyst according to the present invention including the polymer matrix as the support on disposal of aromatic organic compounds present in the air, experiments were performed as follows.

The removal rate and photodecomposition rate of toluene by photocatalysis under a visible light condition (0.025 W/cm$^2$) were measured with respect to the photocatalysts prepared in Examples 2 to 6 and Comparative Example 4. The results are shown in FIG. 21.

Figure 21:
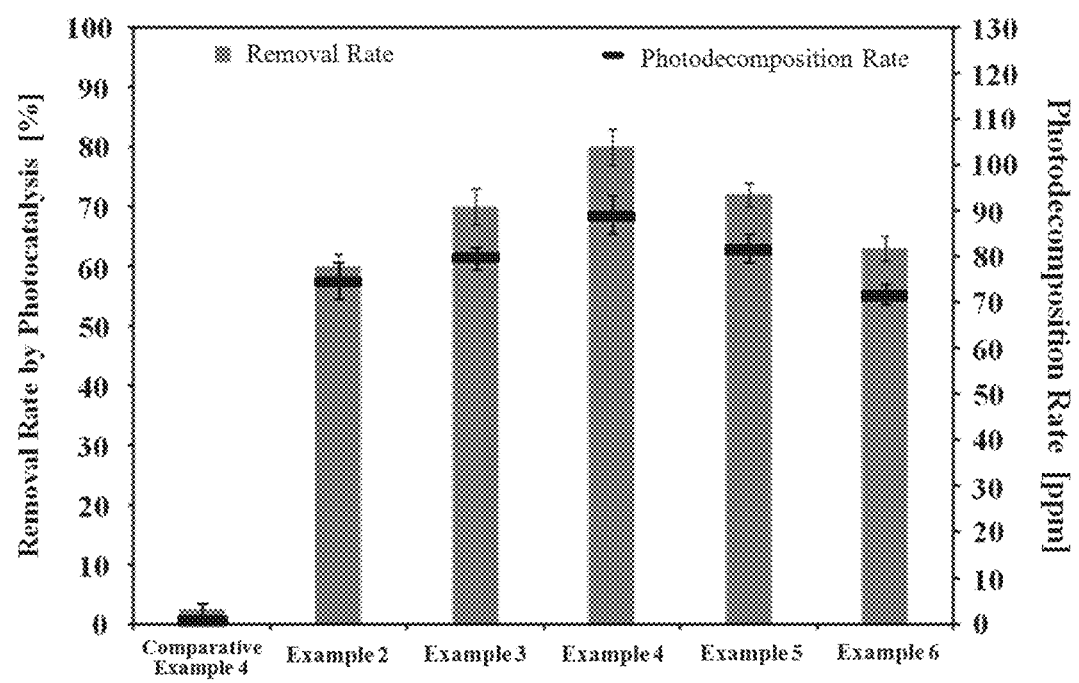
FIG. 21 shows the results of measuring removal rates and photodecomposition rates of toluene by photocatalysis under a visible light condition (0.025 $W/cm^2$) with respect to the photocatalysts prepared in Examples 2 to 6 and Comparative Example 4.

Referring to FIG. 21, it can be seen that toluene was hardly removed under a visible light condition in the case of Comparative Example 4 in which the titanium dioxide was not doped with vanadium. On the other hand, it can be seen that the removal rate of toluene by photocatalysis was shown as high as 80%, and the photodecomposition rate was shown as high as 89.3% in the case of the photocatalysts according to the present invention, particularly the photocatalyst prepared in Example 4. In this case, the removal rate of toluene by photocatalysis refers to a photocatalytic oxidation rate of toluene, and the photodecomposition rate refers to a ratio of toluene that is decomposed into carbon dioxide (CO$_2$) and water (H$_2$O).

The photocatalyst according to the present invention has a structure in which titanium dioxide doped with a transition metal is supported on a support such that the photocatalyst has a low band gap and a high specific surface area. Therefore, the photocatalyst of the present invention can be effectively used in various fields requiring the removal of organic compounds present in water and/or air because the photocatalyst exhibits excellent photocatalytic activity even in a visible light region and also has an excellent effect of adsorbing and removing an compound even under a condition in which the photocatalyst is not irradiated with light.

What is claimed is:

1. A photocatalyst comprising:
   titanium dioxide doped with vanadium (V); and
   a support on which the titanium dioxide is supported,
   wherein the support is a polymer matrix having a porous structure,
   wherein the polymer matrix has a activating surface with an isocyanate group for chemical bond to the titanium dioxide through a silane-based binder,
   wherein an average BET specific surface area of the photocatalyst is in a range of 120 to 480 m$^2$/g,
   wherein the photocatalyst has a band gap of 4 eV or less in a wavelength range of 400 to 700 nm,
   wherein the photocatalyst comprises 4 to 15 parts by weight of the titanium dioxide doped with the vanadium (V), based on 100 parts by weight of the polymer matrix,
   wherein an average volume of pores formed in the polymer matrix is in a range of 0.01 to 0.03 cm$^3$/g,
   wherein the photocatalyst has a light absorbance of 50 to 80% in a wavelength range of 400 to 700 nm.

2. The photocatalyst of claim 1, wherein an average diameter of the pores formed in the polymer matrix is in a range of 50 to 500 μm.

3. The photocatalyst of claim 1, wherein the polymer matrix comprises one or more selected from the group consisting of a polyurethane resin, a polyester resin, and polyamide resin.

* * * * *

UNITED STATES PATENT AND TRADEMARK OFFICE
CERTIFICATE OF CORRECTION

PATENT NO. : 10,695,758 B2
APPLICATION NO. : 16/679351
DATED : June 30, 2020
INVENTOR(S) : Byeong-Kyu Lee et al.

Page 1 of 1

It is certified that error appears in the above-identified patent and that said Letters Patent is hereby corrected as shown below:

On the Title Page

Item (73) Assignee, Line 2, "Corporation" should be changed to -- Cooperation --

Signed and Sealed this
Twentieth Day of October, 2020

Andrei Iancu
*Director of the United States Patent and Trademark Office*